(12) United States Patent
Harris et al.

(10) Patent No.: US 9,821,538 B1
(45) Date of Patent: Nov. 21, 2017

(54) RIBBED CAUL PLATE FOR ATTACHING A STRIP TO A PANEL STRUCTURE AND METHOD FOR USE

(71) Applicant: The Boeing Company, Chicago, IL (US)

(72) Inventors: Todd M. Harris, Graham, WA (US); Frederick Marvin Swanstrom, Burien, WA (US); Melinda Dae Miller, Snohomish, WA (US); Jeffrey David Blanch, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 654 days.

(21) Appl. No.: 13/766,987

(22) Filed: Feb. 14, 2013

Related U.S. Application Data

(60) Continuation-in-part of application No. 13/608,425, filed on Sep. 10, 2012, now Pat. No. 8,393,578, which is a division of application No. 12/489,142, filed on Jun. 22, 2009, now Pat. No. 8,282,042.

(51) Int. Cl.
*B64C 37/02* (2006.01)
*B32B 37/02* (2006.01)

(52) U.S. Cl.
CPC .................................. *B32B 37/02* (2013.01)

(58) Field of Classification Search
CPC ....................................................... B64C 1/12
USPC ........................................................ 244/132
See application file for complete search history.

(56) References Cited

U.S. PATENT DOCUMENTS

| 2,841,344 A | 7/1958 | Stroukoff |
| 2,997,262 A | 8/1961 | Kirk et al. |
| 3,499,622 A | 3/1970 | Lugan et al. |
| 4,316,701 A | 2/1982 | Scarpati et al. |
| 4,575,030 A | 3/1986 | Gratzer |
| 4,619,423 A | 10/1986 | Holmes et al. |
| 4,727,451 A | 2/1988 | Covey |

(Continued)

FOREIGN PATENT DOCUMENTS

| WO | WO2009017864 A2 | 2/2009 |
| WO | WO2011005350 A2 | 1/2011 |

OTHER PUBLICATIONS

International Search Report and Written Opinion, dated Jun. 1, 2011, regarding Application No. PCT/US2010/032615 (WO2011005350), 15 pages. (9-0166PCT).

(Continued)

*Primary Examiner* — Timothy D Collins
*Assistant Examiner* — Keith L Dixon
(74) *Attorney, Agent, or Firm* — Yee & Associates, P.C.

(57) ABSTRACT

A method may be present for securing a strip in a structure. A first surface of the strip may be masked with a first tape. A surface of the structure may be masked with a second tape, the surface of the structure defining a desired shape. A sealant may be applied in a groove in the structure. The strip may be positioned in the surface such that a second surface of the strip contacts the sealant; and a caul plate may be pressed against the first surface of the strip, the caul plate including a set of ribs that contact the fairing strip, and the plurality of ribs defining a shape that substantially matches the shape of the surface of the structure. Pressing the caul plate against the first surface of the strip may cause sealant to pass between the set of ribs onto the tapes.

17 Claims, 28 Drawing Sheets

(56) References Cited

U.S. PATENT DOCUMENTS

| | | | |
|---|---|---|---|
| 5,014,934 A | 5/1991 | McClaflin | |
| 5,065,960 A | 11/1991 | Castellucci | |
| 5,106,037 A | 4/1992 | Sherrill | |
| 5,368,258 A | 11/1994 | Johnson et al. | |
| 5,487,822 A | 1/1996 | Demaray et al. | |
| 5,845,872 A | 12/1998 | Pridham et al. | |
| 6,357,374 B1 | 3/2002 | Moore et al. | |
| 6,736,919 B1* | 5/2004 | Roebroeks | B32B 15/08 156/196 |
| 7,050,286 B2 | 5/2006 | Pridham et al. | |
| 7,143,983 B2 | 12/2006 | McClure | |
| 7,669,800 B2 | 3/2010 | Hernandez | |
| 7,712,993 B2* | 5/2010 | Frisch | E04C 2/243 244/132 |
| 7,735,780 B2 | 6/2010 | Coles | |
| 7,857,258 B2 | 12/2010 | Normand et al. | |
| 7,896,294 B2 | 3/2011 | Dittrich | |
| 7,915,371 B2 | 3/2011 | Byrd et al. | |
| 8,016,230 B2 | 9/2011 | Fogarty et al. | |
| 8,209,865 B2 | 7/2012 | Kelley et al. | |
| 8,282,042 B2* | 10/2012 | Parikh | B64C 1/12 244/130 |
| 2004/0035979 A1 | 2/2004 | McCoskey, Jr. et al. | |
| 2004/0089764 A1 | 5/2004 | McClure | |
| 2005/0103936 A1 | 5/2005 | Pridham et al. | |
| 2006/0163431 A1 | 7/2006 | Dittrich | |
| 2007/0181747 A1 | 8/2007 | Byrd et al. | |
| 2008/0121758 A1 | 5/2008 | Hernandez | |
| 2009/0020646 A1 | 1/2009 | Normand et al. | |
| 2009/0026804 A1 | 1/2009 | Ciprian | |
| 2009/0159745 A1 | 6/2009 | Coles | |
| 2009/0266870 A1 | 10/2009 | Yousefiani et al. | |
| 2010/0006702 A1 | 1/2010 | Fogarty et al. | |
| 2010/0078155 A1 | 4/2010 | Morra | |
| 2010/0170994 A1* | 7/2010 | Burns | B64C 1/12 244/130 |
| 2010/0308171 A1 | 12/2010 | Kelley et al. | |
| 2010/0320325 A1 | 12/2010 | Parikh et al. | |
| 2011/0049298 A1 | 3/2011 | Makela | |
| 2011/0168324 A1 | 7/2011 | Ender | |
| 2013/0000821 A1 | 1/2013 | Parikh et al. | |

OTHER PUBLICATIONS

Anders et al., "F-16XL-2 Supersonic Laminar Flow Control Flight Test Experiment," NASA/TP-1999-209683, Dec. 1999, 4 pages.

Drake et al., "Wing Leading Edge Joint Laminar Flow Tests," NASA Technical Memorandum 4762, Oct. 1996, 35 pages.

Zuniga et al., "Transonic Flight Test of a Laminar Flow Leading Edge with Surface Excrescences," 7th Biennial AIAA Flight Test Conference Technical Paper No. AIAA-94-2142-CP, Jun. 1994, pp. 267-278.

"High Reynolds Number Hybrid Laminar Flow Control (HLFC) Flight Experiment Final Report vol. III: Leading Edge Design, Fabrication, and Installation," The Boeing Company, Nov. 1992, 9 pages.

Kennelly, Jr. et al., "Smoother Wing Leading-Edge Joints Would Favor Laminar Flow," NASA Tech Briefs ARC114088, Jun. 1999, 2 pages. Retrieved Jul. 8, 2009 from http://www.techbriefs.com/index.php?option=com_staticxt&staticfile=/Briefs/June99/ARC14088.html.

Office Action, dated Oct. 17, 2011, regarding U.S. Appl. No. 12/489,142, 27 pages.

Final Office Action, dated Feb. 2, 2012, regarding U.S. Appl. No. 12/489,142, 15 pages.

Notice of Allowance, dated Jun. 7, 2012, regarding U.S. Appl. No. 12/489,142, 9 pages.

Notice of Allowance, dated Nov. 9, 2012, regarding U.S. Appl. No. 13/608,425, 19 pages.

* cited by examiner

RIBBED CAUL PLATE FOR ATTACHING A STRIP TO A PANEL STRUCTURE AND METHOD FOR USE

CROSS-REFERENCE TO RELATED APPLICATION

This application is a continuation-in-part of patent application U.S. Ser. No. 13/608,425, filed Sep. 10, 2012, entitled "Skin Panel Joint for Improved Airflow," status Pending, which is a Divisional Application of U.S. Ser. No. 12/489,142, filed Jun. 22, 2009, entitled "Skin Panel Joint for Improved Airflow," now U.S. Pat. No. 8,282,042, issued on Oct. 9, 2012, both of which are hereby incorporated herein by reference.

BACKGROUND INFORMATION

1. Field

The present disclosure relates generally to a method and apparatus for positioning a strip in a structure. More particularly the disclosure relates to affixing a fairing strip in a skin panel joint of an aircraft for improved airflow. Still more particularly the disclosure relates to use of a ribbed caul plate for positioning and attaching a strip to a panel structure so as to manage adhesive flow.

2. Background

A fixed-wing aircraft may be a heavier-than-air vehicle capable of flying in the air. A fixed-wing aircraft may be capable of flying due to lift, which may be generated by the wings of the aircraft. Lift may be a component of an air dynamic force acting on the aircraft. This force may be perpendicular to an oncoming flow direction. During flight, an aircraft may also experience a drag force that may be in the direction of air flow.

The performance of an aircraft may be improved through the reduction of drag that may occur when air flows over the surface of an aircraft. Laminar flow may be used to reduce drag on an aircraft. Laminar flow occurs when air flows in parallel layers without mixing between the layers of air.

With an aircraft wing, air flowing over the wing may have a boundary layer. A boundary layer may be a very thin layer of air lying over the surface of the wing and other surfaces of the aircraft. This layer of air may tend to adhere to the aircraft wing. As the aircraft wing moves forward through the air, the boundary layer at first may flow smoothly with laminar flow over the wing.

Surface discontinuities may disrupt the laminar boundary layer of air over an aircraft wing and cause it to become turbulent. A turbulent boundary layer may be characterized by increased mixing between layers of air within the boundary layer. The drag caused by a turbulent boundary layer may be as much as around 5 to 10 times larger than the drag of a laminar boundary layer. This transition from laminar flow to turbulent flow within the boundary layer may increase drag. Also, this transition may produce undesirable noise, decrease fuel efficiency, and/or other undesirable effects during flight. These discontinuities may be caused by, for example, without limitation, steps and/or gaps in joints between skin panels on an aircraft.

Maintaining a laminar boundary layer past joints between skin panels on a painted aircraft may require changes in the surface that may have tight tolerances to avoid turbulent flow. For example, these changes may include tolerances for a step in the surface, a gap, waviness, and/or other discontinuities on the surface of the aircraft. A step may be a deviation from a plane across a skin panel joint on a surface. A step also may be an abrupt deviation from a desired smoothness for the surface.

For example, a tolerance for a step may be around 0.002 inches or less to maintain a laminar boundary layer past a joint. Gaps within this tolerance may be from around 0.020 inches to around 0.050 inches. This tolerance may be difficult to achieve at joints in which skin panels meet each other with currently used manufacturing and/or installation methods for skin panels for aircraft. Further, the removal and/or reinstallation of skin panels during maintenance also may provide challenges to meeting desired tolerances for maintaining laminar flow over the surface of an aircraft.

One solution involves filling a gap between skin panels with a filler such as, for example, without limitation, a hardened epoxy filler putty. With this type of solution, fastener heads may be recessed below the surface. These fastener heads may then be covered with an epoxy filler. The epoxy filler may then be sanded to obtain the desired smoothness with respect to the surface of the skin panels. Further, mismatches at low spots at which the skin panels are attached to the support structure also may be filled with an epoxy filler and sanded down.

This type of approach, however, may be labor intensive and increase the cost of manufacturing or maintaining an aircraft. Further, the durability of these types of fillers may require reapplication of the fillers more frequently than desired. As a result, an aircraft may be out of service for maintenance more often than desired.

Therefore, it would be advantageous to have a method and apparatus that takes into account one or more of the issues discussed above, as well as possibly other issues.

SUMMARY

In one illustrative embodiment, a method may be present for securing a strip. A sealant may be applied to a groove. A strip may be positioned in the groove, in which the strip may contact the sealant. A caul plate may be pressed on the strip so as to allow sealant to pass between ribs in the caul plate.

In another illustrative embodiment, a method may be present for securing a strip in a structure. A first surface of the strip may be masked with a first tape. A surface of the structure may be masked with a second tape, the surface of the structure defining a desired shape. A sealant may be applied in a groove in the structure. The strip may be positioned in the surface such that a second surface of the strip contacts the sealant; and a caul plate may be pressed against the first surface of the strip, the caul plate including a set of ribs that contact the fairing strip, and the plurality of ribs defining a shape that substantially matches the shape of the surface of the structure. Pressing the caul plate against the first surface of the strip may cause sealant to pass between the set of ribs onto the first tape on the first surface of the strip and onto the second tape of the surface of the structure.

In yet another embodiment, an assembly may comprise a strip, a first masking tape, a structure, a second masking tape, a caul plate, and a sealant. The strip may have a first surface. The first masking tape may be positioned on the first surface of the strip. The structure may define a groove, and the structure may have a surface. The strip may be positioned in the groove. The second masking tape may be positioned on the surface of the structure. The caul plate may have a set of ribs, and the caul plate may be positioned such that the set of ribs contact the strip and contact the structure so as to substantially align the first surface of the strip with the surface of the structure. The sealant may be disposed between the strip and the groove, on the first masking tape, on the second masking tape, and between the set of ribs.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
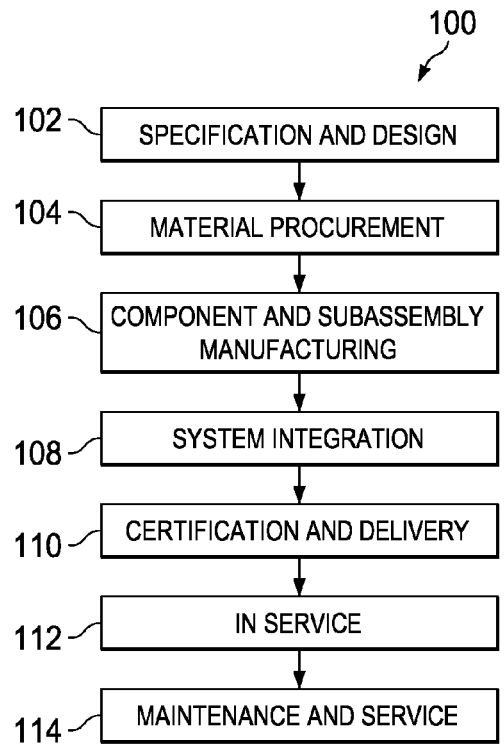
FIG. 1 is an illustration of an aircraft manufacturing and service method in accordance with an illustrative embodiment.
Figure 2:
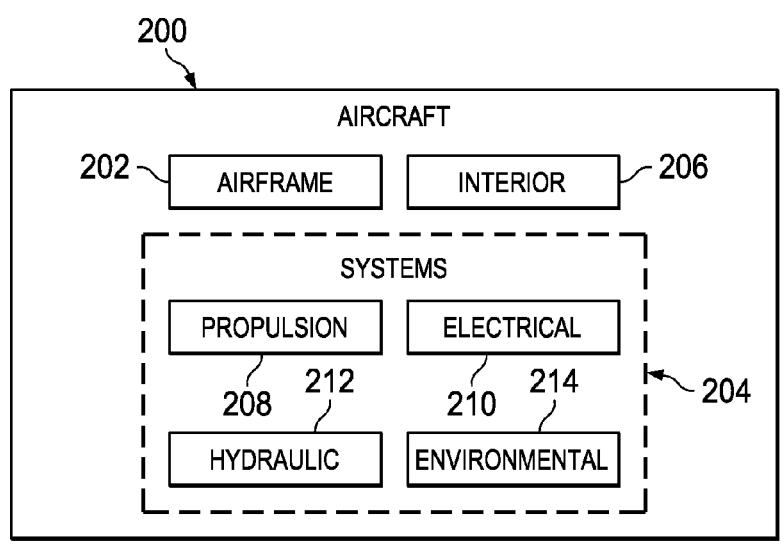
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of or reduce the cost of aircraft 200.

One or more of the illustrative embodiments may include an apparatus having a first skin panel having a first surface, a second skin panel having a second surface, a first flange located at the end of the first skin panel, a second flange located at the end of the second skin panel, and a strip having a surface. The first skin panel may be located adjacent to the second skin panel such that the first flange and the second flange form a channel. This channel may be part of a joint. The strip may be bonded in the channel. The fluid flow over the surface of the strip, the surface of the first skin panel, and the surface of the second skin panel may have a desired level. For example, the surface of the strip may be flush with the surfaces of the adjacent skin panels such that laminar flow may occur.

The illustrative embodiments described herein also recognize and take into account that a more generalized method may be adapted for positioning and joining a strip to a panel structure. The generalized method may have application beyond the field of aviation or aerospace. For example an adhesive may be used in positioning and joining a strip to a panel structure. The panel structure and/or the strip may comprise composite materials which are subject to curing including vacuum curing. The illustrative embodiments recognize and take into account that management of the adhesive, including management of the excess or overflow of adhesive materials, would present advantages over the current state of the art.

Figure 3:
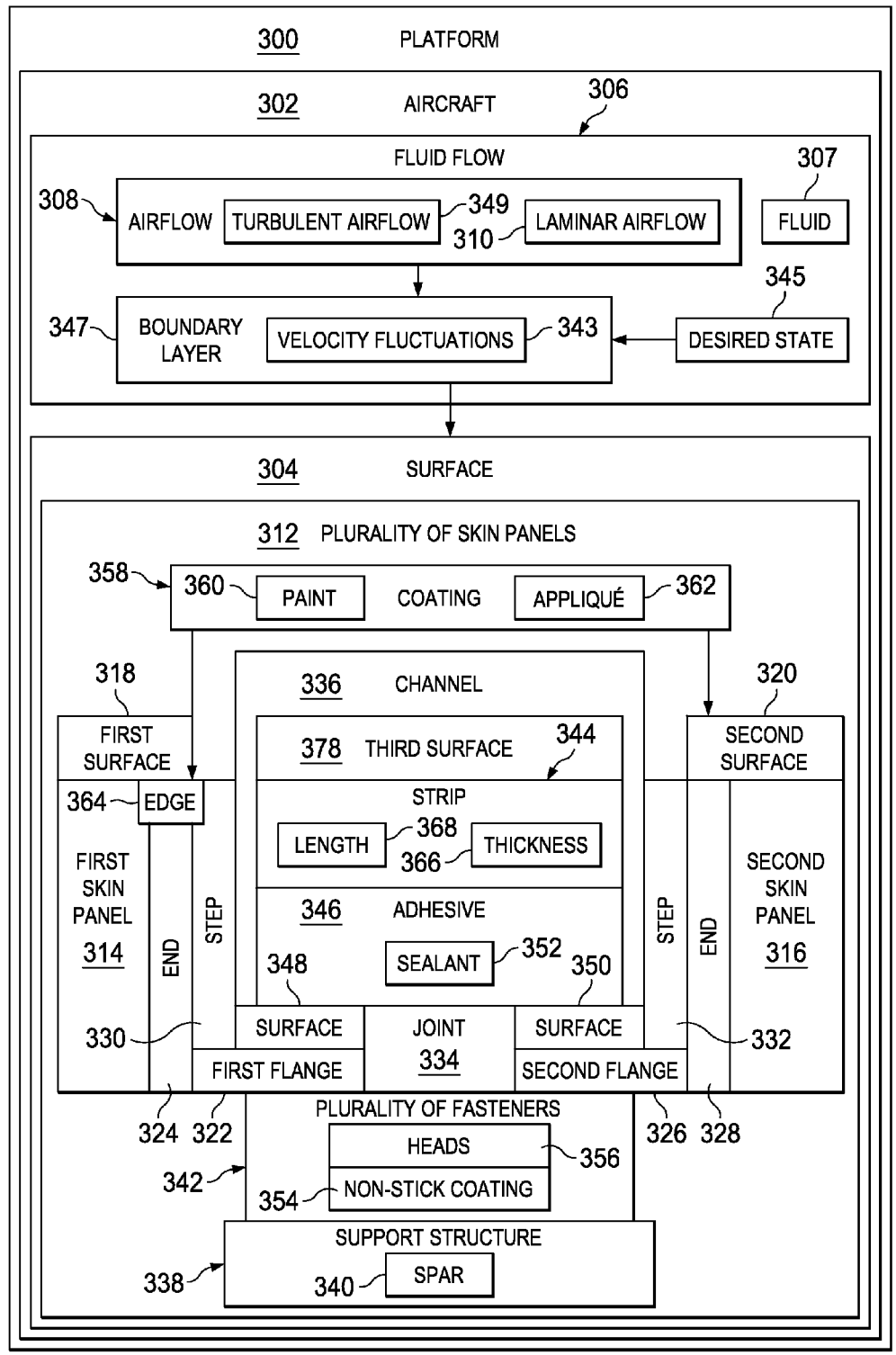
FIG. 3 is an illustration of a platform having surfaces with improved fluid flow in accordance with an illustrative embodiment.

With reference now to FIG. 3, an illustration of a platform having surfaces with improved fluid flow is depicted in accordance with an illustrative embodiment. In this illustrative embodiment, platform 300 may take the form of aircraft 302. Aircraft 302 may be, for example, without limitation, aircraft 200 in FIG. 2. In this illustrative example, aircraft 302 may have surface 304 over which fluid flow 306 may occur. Fluid flow 306 may be movement of fluid 307 over surface 304. For example, fluid flow 306 may take the form of airflow 308 in these depicted examples. Airflow 308 may take the form of laminar airflow 310.

In these depicted examples, surface 304 may comprise plurality of skin panels 312. For example, without limitation, plurality of skin panels 312 may include first skin panel 314 and second skin panel 316. First skin panel 314 may have first surface 318, and second skin panel 316 may have second surface 320. Additionally, first flange 322 may be associated with first skin panel 314 at end 324 of first skin panel 314. Second flange 326 may be associated with second skin panel 316 at end 328 of second skin panel 316.

A first component may be considered to be associated with a second component by being secured to the second component, bonded to the second component, fastened to the second component, and/or connected to the second component in some other suitable manner. The first component also may be considered to be associated with the second component by being formed as part of and/or an extension of the second component.

First flange 322 may have step 330, while second flange 326 may have step 332. In these illustrative examples, step 330 and step 332 may be below first surface 318 and second surface 320, respectively. In these illustrative examples, end 324 of first skin panel 314 may be located adjacent to end 328 of second skin panel 316 to form joint 334. End 324 and end 328 may be arranged such that first flange 322 and second flange 326 form channel 336.

Plurality of skin panels 312 may take various forms. For example, without limitation, plurality of skin panels 312 may be comprised of materials selected from at least one of aluminum, steel, titanium, a composite material, and/or any other suitable material.

In these illustrative examples, first flange 322 and second flange 326 may be made of the same material as first skin panel 314 and second skin panel 316 or from a different material, depending on the particular implementation.

In these illustrative examples, first skin panel 314 and second skin panel 316 may be attached to support structure 338. Support structure 338, in this example, may be spar 340. Of course, support structure 338 may take other forms, such as a frame, a stringer, a clip, a rib, or any other flanged structure.

In particular, first flange 322 for first skin panel 314 and second flange 326 for second skin panel 316 may be attached to support structure 338. In these illustrative examples, plurality of fasteners 342 may attach first flange 322 and second flange 326 to support structure 338 to form joint 334.

Strip 344 may be bonded in channel 336 for joint 334. In these illustrative examples, strip 344 may take various forms. For example, without limitation, strip 344 may be comprised of plastic, a composite material, titanium, aluminum, or some other suitable material. Strip 344 may be bonded in channel 336 using adhesive 346. Adhesive 346 may be any compound in a liquid and/or semi-liquid state that may be used to bond strip 344 in channel 336.

In particular, adhesive 346 may be placed onto surface 348 of first flange 322 and surface 350 of second flange 326 in channel 336. Then strip 344 may be placed into channel 336. In other illustrative embodiments, adhesive 346 may be applied to strip 344 and/or surface 348 of first flange 322 and surface 350 of second flange 326 prior to the joining of first flange 322 and second flange 326 to form channel 336. Strip 344 with adhesive 346 may then be placed onto surface 348 and surface 350.

In these illustrative examples, adhesive 346 also may act as sealant 352. In other words, adhesive 346 may be selected as a material that may prevent and/or reduce the penetration of undesirable components such as, for example, without limitation, air, gas, water, dust, and/or other undesirable components. Further, adhesive 346 may be selected as a material that may elongate and/or remain flexible during use. The selection of adhesive 346 may be such that cracking may be reduced and/or avoided during use.

In these depicted examples, plurality of fasteners 342 may have non-stick coating 354 on heads 356 of plurality of fasteners 342. Non-stick coating 354 may allow for easier removal of plurality of fasteners 342 during maintenance operations. For example, without limitation, non-stick coating 354 may prevent and/or reduce sticking of adhesive 346 to heads 356 of plurality of fasteners 342. Further, plurality of fasteners 342 may be countersunk into surface 348 of first flange 322 and surface 350 of second flange 326.

Strip 344 may be selected using a material having a similar thermal coefficient of expansion as first skin panel 314 and second skin panel 316. Also, strip 344 may be selected using a material that provides flexibility or flexing of strip 344 during use.

At least one of first skin panel 314 and second skin panel 316 may have coating 358. Coating 358 may be, for example, without limitation, paint 360, appliqué 362, and/or some other suitable type of coating. When coating 358 is applied to first surface 318 of first skin panel 314, coating 358 may extend over edge 364 of first skin panel 314 at end 324 into channel 336. Coating 358 may extend only into a portion of channel 336 rather than all of channel 336.

Strip 344 may be selected to have thickness 366 and length 368. These parameters and/or other parameters of strip 344 may be selected to provide a desired level of fluid flow 306 over first skin panel 314 and second skin panel 316. In these examples, these parameters may be selected such that first surface 318 of first skin panel 314, second surface 320 of second skin panel 316, and third surface 378 of strip 344 have desired state 345 of fluid flow 306. More specifically, these parameters may be selected such that boundary layer 347 of fluid flow 306 may have desired state 345.

Desired state 345 of fluid flow 306 may be at least one of fluid flow 306 over joint 334, over all of first surface 318 of first skin panel 314, second surface 320 of second skin panel 316, and third surface 378 of strip 344 on joint 334, a portion of either or both first surface 318 of first skin panel 314, second surface 320 of second skin panel 316, and third surface 378 of strip 344 over joint 334, or some other combination of components including joint 334.

In these illustrative examples, desired state 345 for boundary layer 347 may be substantially laminar airflow 310. Laminar airflow 310 may be distinguished from turbulent airflow 349 for boundary layer 347 by detecting velocity fluctuations 343 within boundary layer 347, in these examples. For example, without limitation, velocity fluctuations 343 may be detected through the use of a laser anemometer.

The illustration of platform 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, platform 300 may take other forms. For example, platform 300 may be a submarine, and fluid flow 306 may be the flow of water. In yet other illustrative embodiments, only some of plurality of skin panels 312 may include a joint with a configuration such as joint 334 as described above.

Figure 4:
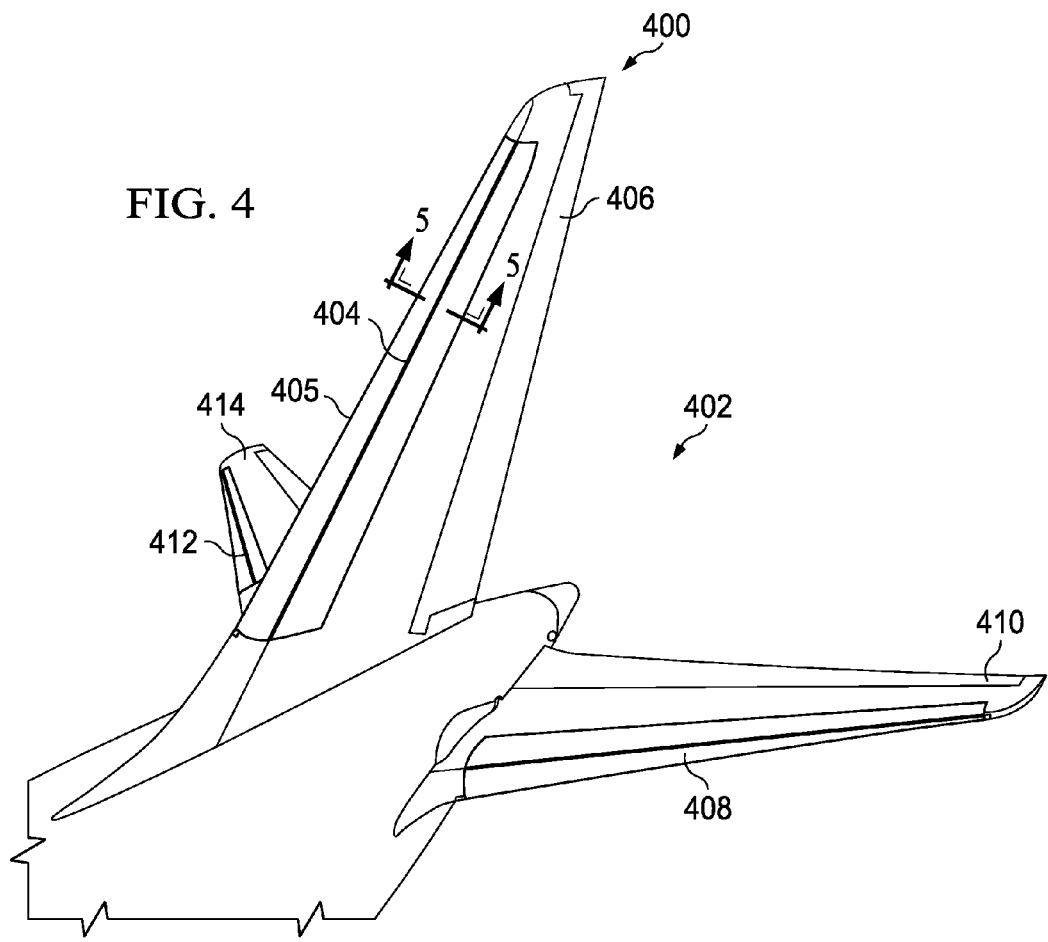
FIG. 4 is an illustration of a portion of an aircraft in accordance with an illustrative embodiment.

With reference now to FIG. 4, an illustration of a portion of an aircraft is depicted in accordance with an illustrative embodiment. In this illustrative example, tail 400 of aircraft 402 is depicted. Aircraft 402 may be an example of one implementation of aircraft 302 in FIG. 3. In this example, the different illustrative embodiments may be applied to joint 404 near leading edge 405 of vertical stabilizer 406. The different illustrative embodiments also may be applied to other joints such as, for example, without limitation, joints 408 and 412 on horizontal stabilizers 410 and 414, respectively. These joints may be implemented using joint 334 in FIG. 3.

Figure 5:
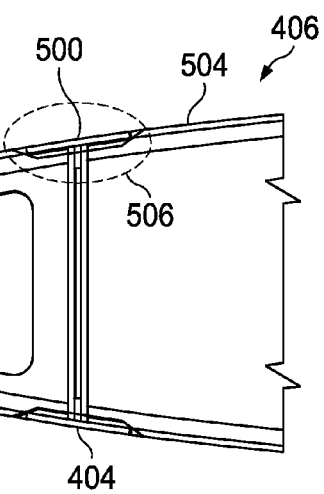
FIG. 5 is an illustration of a cross-sectional view of a portion of a vertical stabilizer in accordance with an illustrative embodiment.

With reference next to FIG. 5, an illustration of a cross-sectional view of a portion of a vertical stabilizer is depicted in accordance with an illustrative embodiment. Joint 500 may be an example of one physical implementation for joint 334 in FIG. 3.

In this depicted example, vertical stabilizer 406 may be illustrated in a cross section taken along lines 5-5 in FIG. 4. In this example, joints 404 and 500 may be seen for vertical stabilizer 406. As can be seen in this example, joint 500 may be formed where skin panel 502 and skin panel 504 meet. Section 506 is shown in more detail below in FIG. 6.

Figure 6:
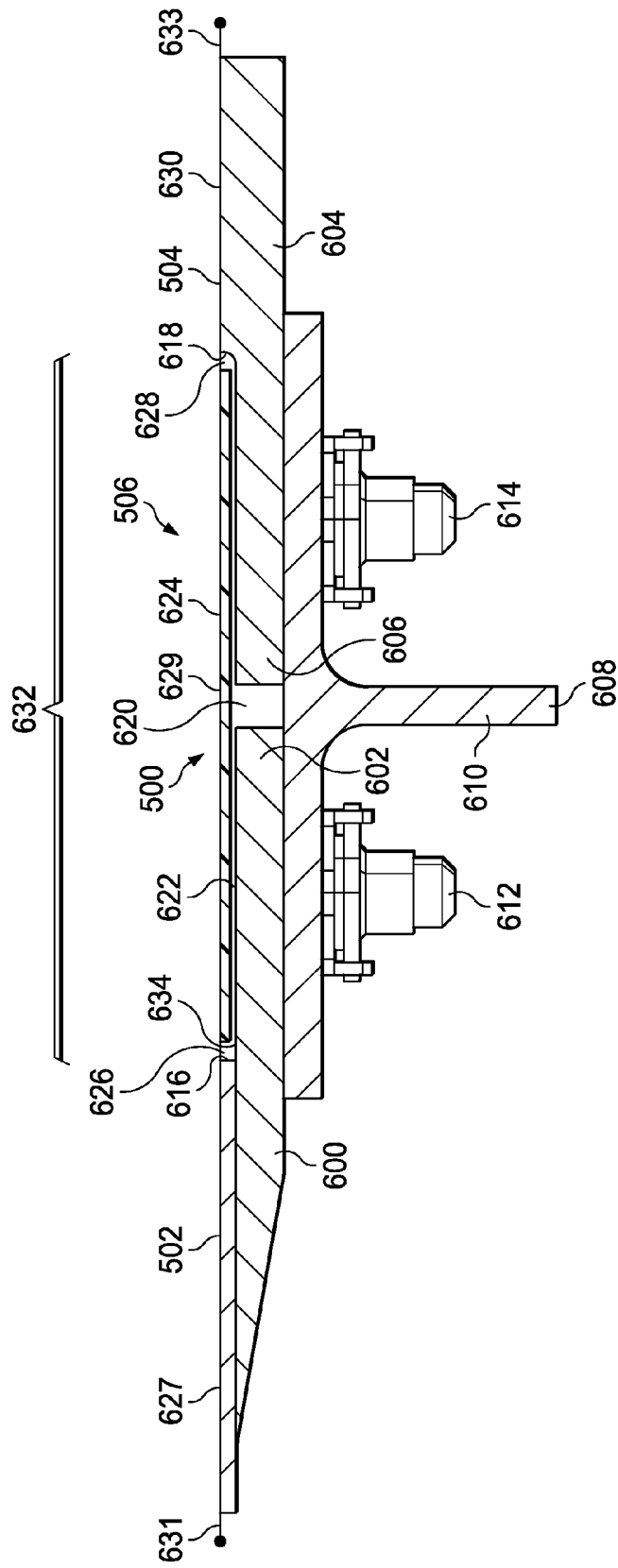
FIG. 6 is an illustration of a more-detailed view of a joint in a vertical stabilizer in accordance with an illustrative embodiment.

With reference now to FIG. 6, an illustration of a more-detailed view of a joint in a vertical stabilizer is depicted in accordance with an illustrative embodiment. In this depicted example, flange 600 may be located at end 602 of skin panel 502. Flange 604 may be located at end 606 of skin panel 504.

In this illustrative example, flange 600 and flange 604 may be attached to support structure 608. In this illustrative example, support structure 608 may take the form of spar 610. Flange 600 may be attached to support structure 608 by fastener 612, and flange 604 may be secured to support structure 608 by fastener 614. As can be seen, step 616 may be present in flange 600, and step 618 may be present in flange 604. Additionally, gap 620 may be present between flange 600 and flange 604. In these illustrative examples, flanges 600 and 604 may be bonded to skin panels 502 and 504, respectively.

As can be seen in FIG. 6, flange 600 and flange 604 may form channel 622. Strip 624 may be bonded in channel 622. Gap 626 and gap 628 may still be present. Each of these gaps may have a width of around 0.020 inches to around 0.050 inches in these particular examples. Of course, other tolerances may be used, depending on the particular implementation. For example, the size of these gaps may be selected as being small enough to avoid undesirable airflow over surface 627 of skin panel 502, surface 629 of strip 624, and surface 630 of skin panel 504.

In these depicted examples, surface 627 of skin panel 502, surface 629 of strip 624, and surface 630 of skin panel 504 may lie substantially along plane 631 as indicated by line 633. In other words, strip 624 may be positioned relative to skin panel 502 and skin panel 504 such that these surfaces may provide airflow having a desired state. The desired state, in these examples, may be laminar airflow.

In this illustrative example, channel 622 may have length 632 and depth 634. Length 632 may be, for example, without limitation, around 1.80 inches. Depth 634 may be, for example, without limitation, around 0.04 inches. As can be seen, strip 624 may cover fasteners 612 and 614. Further, the dimensions of strip 624 may be selected to accommodate variations in skin panel 502 and/or skin panel 504. Additionally, strip 624 also may be selected to accommodate thicknesses for coatings that may be placed onto surface 627 and surface 630 of skin panel 502 and skin panel 504.

Figure 7:
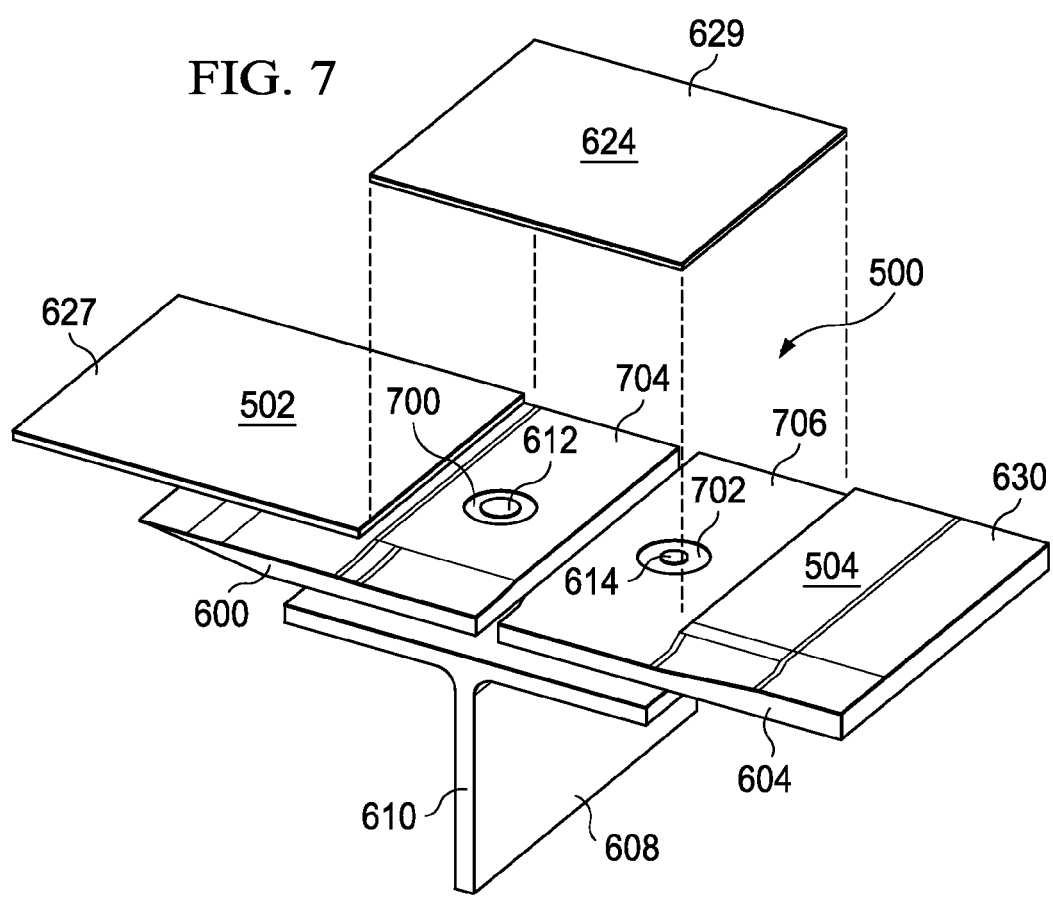
FIG. 7 is an illustration of an exploded perspective view of a joint in accordance with an illustrative embodiment.

Turning now to FIG. 7, an illustration of an exploded perspective view of a joint is depicted in accordance with an illustrative embodiment. As can be seen in this illustrative example, head 700 for fastener 612 and head 702 for fastener 614 may be seen. Head 700 and head 702 may be countersunk into surface 704 of flange 600 and surface 706 of flange 604. In this illustrative example, head 700 and head 702 may be at a level substantially flush with surface 704. In other examples, head 700 and head 702 may be at a level below surface 704. Additionally, head 700 and head 702 may have a non-stick coating, which may allow for easier maintenance if strip 624 is removed from joint 500.

Turning now to FIGS. 8-13, illustrations of installation of a strip into a channel in a joint are depicted in accordance with an illustrative embodiment. These different figures may illustrate an illustrative example of one manner in which a strip, such as strip 344, may be installed to complete a joint, such as joint 334 in FIG. 3. This installation may occur during, for example, without limitation, at least one of manufacturing of joint 334 and maintenance of joint 334.

Figure 8:
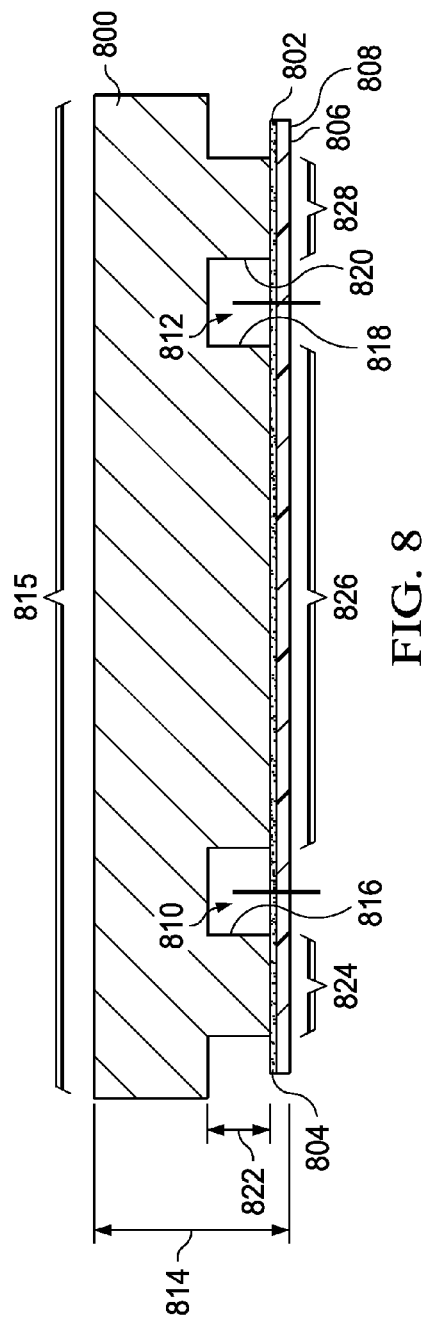
FIG. 8 is an illustration of an installation block in accordance with an illustrative embodiment.

With reference to FIG. 8, an illustration of an installation block is depicted in accordance with an illustrative embodiment. In this illustrative example, installation block 800 may have double-sided tape 802 applied to side 804 of installation block 800. Double-sided tape 802 may have protective cover 806 on side 808. Slits 810 and 812 may be cut into double-sided tape 802 in these examples.

As depicted, installation block 800 may have height 814 and length 815. Height 814 may be around 1 inch, and length 815 may be around 4 inches in these illustrative examples. Additionally, installation block 800 also may have flange 816, flange 818, and flange 820. Each of these flanges may have height 822. Height 822 may be around 0.5 inches in these examples. Flange 816 may have length 824, flange 818 may have length 826, and flange 820 may have length 828. Lengths 824 and 828 may be around 0.5 inches, and length 826 may be around 1.7 inches. In these examples, installation block 800 may be comprised of a material such as, for example, without limitation, aluminum and/or some other suitable material.

Figure 9:
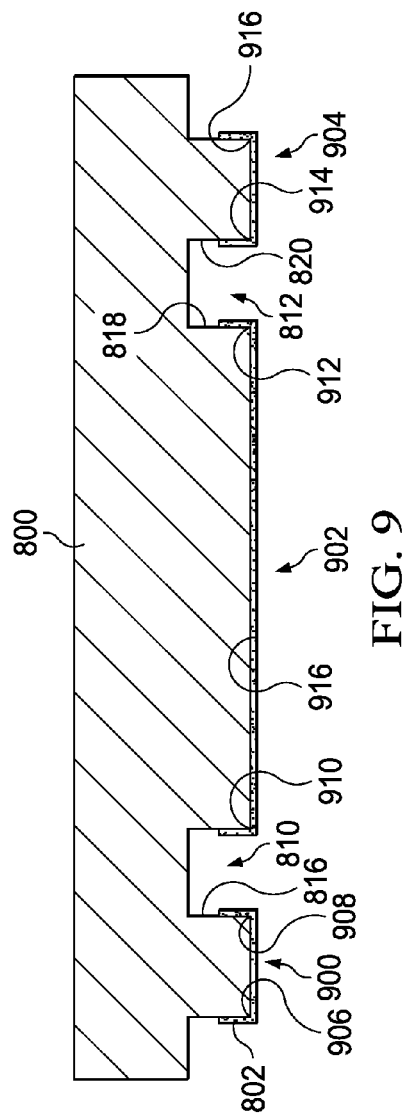
FIG. 9 is an illustration of double-sided tape installed on an installation block in accordance with an illustrative embodiment.

With reference now to FIG. 9, an illustration of double-sided tape installed on an installation block is depicted in accordance with an illustrative embodiment. In this illustrative example, after slits 810 and 812 have been formed as depicted in FIG. 8, sections 900, 902, and 904 may be present for double-sided tape 802. Section 900 may be wrapped around corners 906 and 908 for flange 816. Section 902 may be wrapped around corners 910 and 912 of flange 818. Section 904 may be wrapped around corners 914 and 916 for flange 820.

Figure 10:
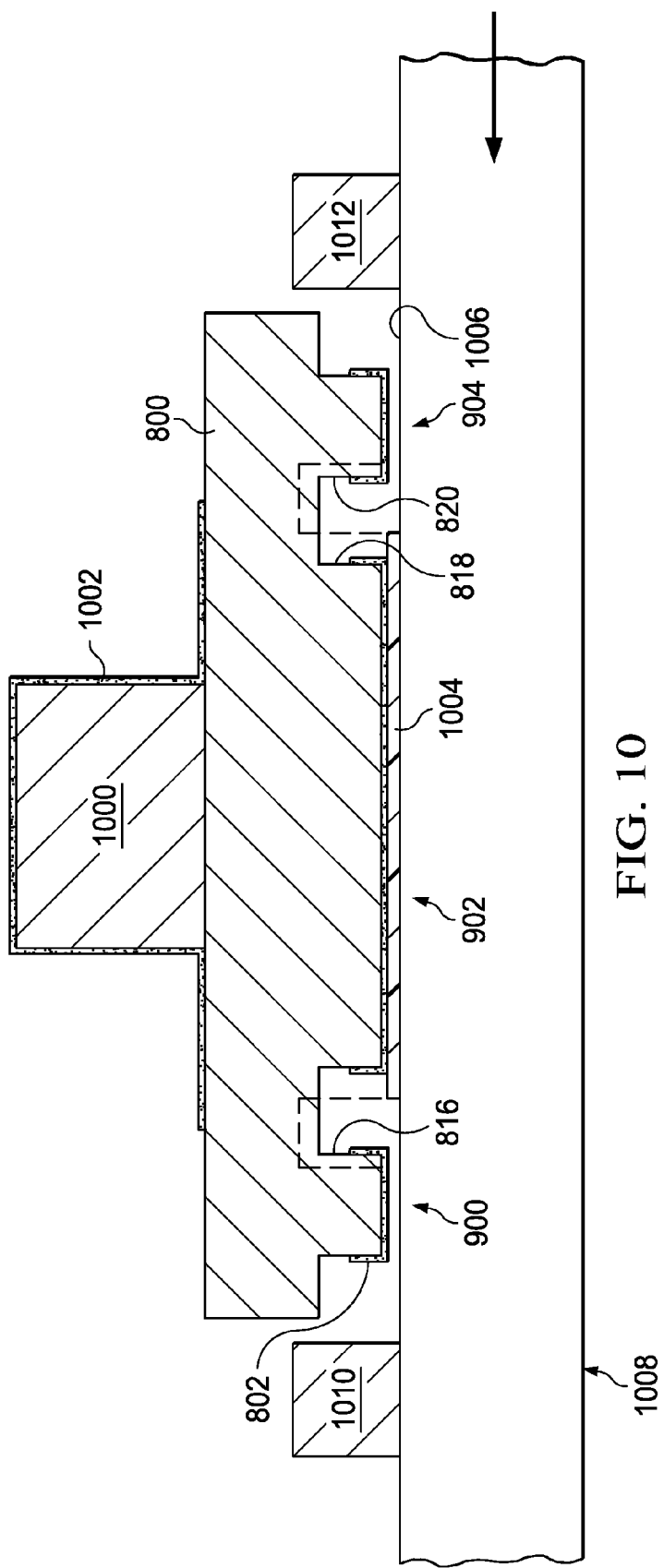
FIG. 10 is an illustration of an installation block attached to a strip in accordance with an illustrative embodiment.

With reference next to FIG. 10, an illustration of an installation block attached to a strip in an assembly crib is depicted in accordance with an illustrative embodiment. In this illustrative example, a side view of installation block 800 is shown. In this example, installation bar 1000 may be associated with installation block 800. In this illustrative example, installation bar 1000 may be associated with installation block 800 by attaching installation bar 1000 to installation block 800 with tape 1002. Of course, installation bar 1000 may be associated with installation block 800 in other ways. For example, without limitation, installation bar 1000 may be attached to installation block 800 by temporary fasteners. In these illustrative examples, installation bar 1000 may be comprised of a material such as, for example, without limitation, aluminum.

In this depicted example, installation block 800 may be positioned over strip 1004. In this example, strip 1004 may be located on surface 1006 of assembly crib 1008. Installation block 800 may be positioned to be attached to strip 1004 using guard rail 1010 and guard rail 1012 on assembly crib 1008. As can be seen in this illustrative example, section 902 on flange 818 may contact and/or become attached to strip 1004. Section 900 on flange 816 and section 904 on flange 820 may not contact strip 1004.

Figure 11:
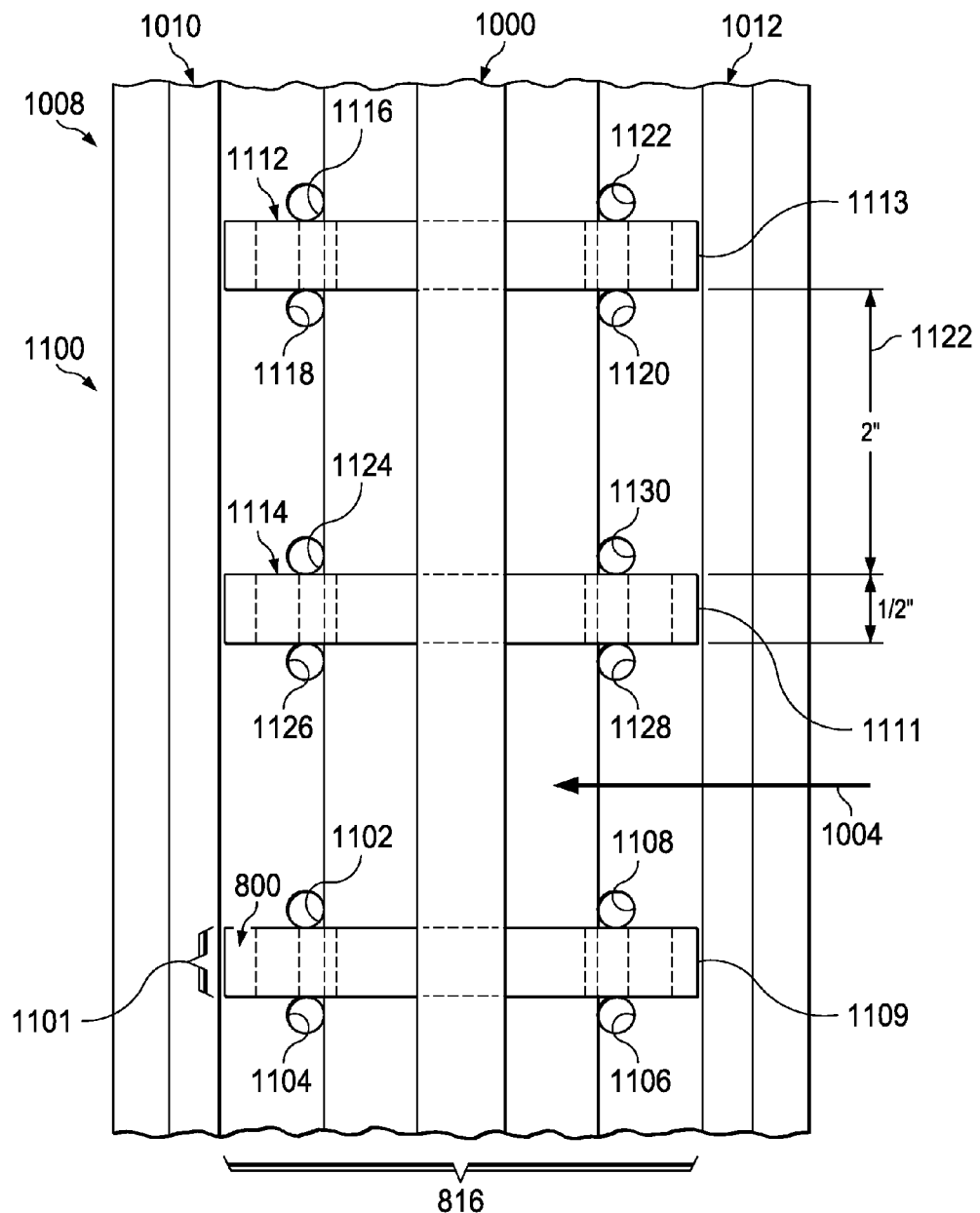
FIG. 11 is an illustration of a top view of an assembly crib in accordance with an illustrative embodiment.

Turning now to FIG. 11, an illustration of a top view of an assembly crib is depicted in accordance with an illustrative embodiment. In this illustrative example, installation block 800 may be seen positioned over strip 1004. Installation block 800 may have width 1101. Width 1101 may be, for example, without limitation, from around 0.500 to around 0.750 inches.

Additional alignment of installation block 800 may be provided through number of pegs 1100. In this example, number of pegs 1100 may include peg 1102, peg 1104, peg 1106, and peg 1108.

In this top view, installation blocks 1112 and 1114 also may be seen. These installation blocks may be positioned using guard rails 1010 and 1012. In these examples, installation blocks 800, 1112, and 1114 may be positioned with a distance of around 2 inches in between each other. In other examples, the installation blocks may be positioned with a different spacing. Additionally, installation block 1112 also may be positioned using installation pegs 1116, 1118, 1120, and 1122. Installation block 1114 may be positioned using installation pegs 1124, 1126, 1128, and 1130, and/or other installation pegs.

Once installation blocks, such as installation blocks 800, 1112, and 1114, have been attached to strip 1004, installation bar 1000 may be attached on top of installation blocks 800, 1112, and 1114. Strip 1004 may then be moved and positioned into the channel using installation blocks 800, 1112, and 1114 with installation bar 1000. In these illustrative examples, additional installation blocks (not shown) may be positioned over strip 1004. An installation bar, such as installation bar 1000, also may be attached to these additional installation blocks.

Figure 12:
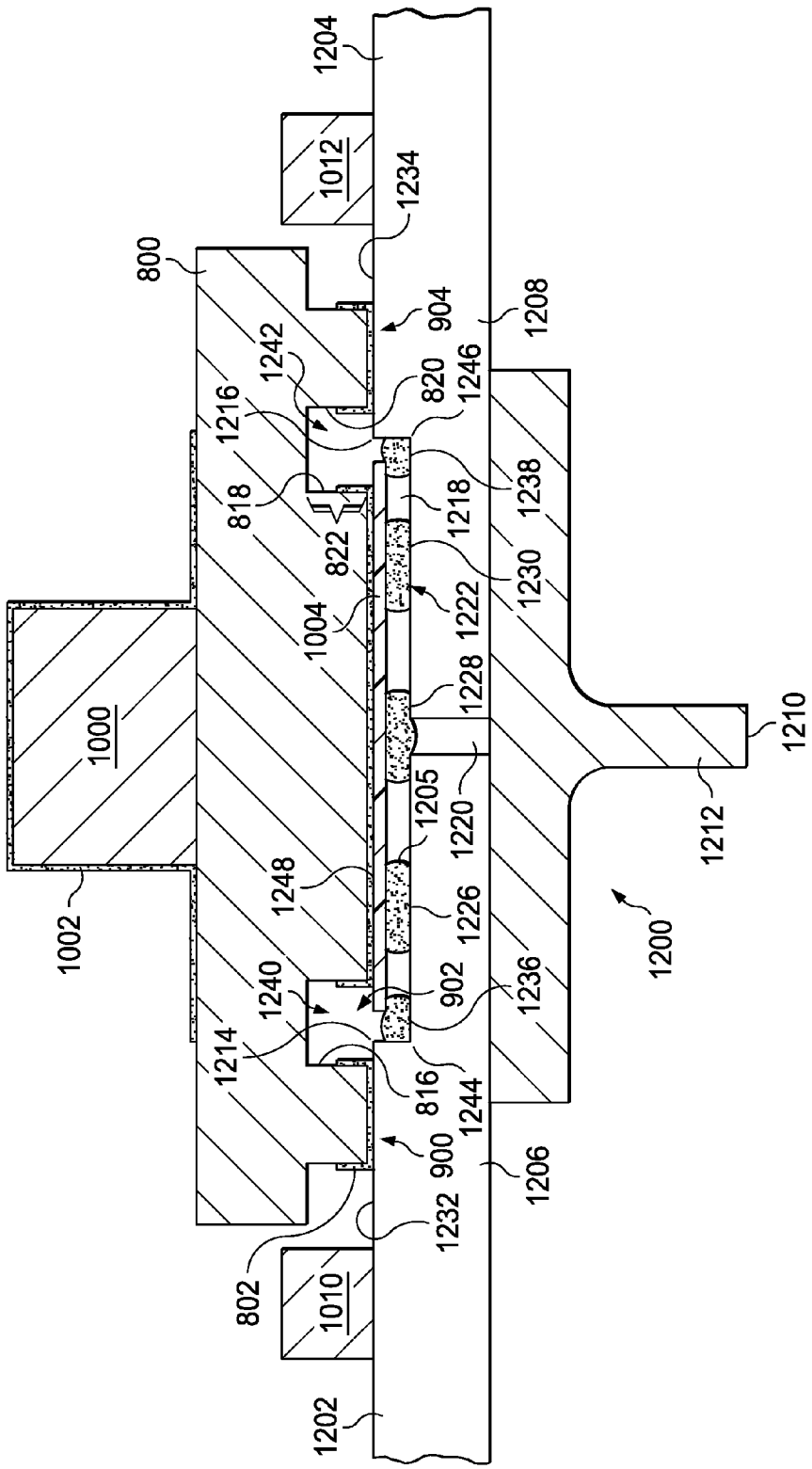
FIG. 12 is an illustration of a strip installed into a channel using an installation block in accordance with an illustrative embodiment.

With reference now to FIG. 12, an illustration of a strip installed into a channel using an installation block is depicted in accordance with an illustrative embodiment. In this illustrative example, installation block 800 may be seen in a side view over joint 1200.

Joint 1200 may include first skin panel 1202 and second skin panel 1204. First skin panel 1202 may have first flange 1206, while second skin panel 1204 may have second flange

1208. First flange 1206 and second flange 1208 may be attached to support structure 1210, which may be spar 1212 in these examples. As can be seen, first flange 1206 and second flange 1208 may have step 1214 and step 1216, which form channel 1218 in this configuration. As can be seen, gap 1220 may be present between first flange 1206 and second flange 1208 within channel 1218.

Prior to strip 1004 being positioned in channel 1218, adhesive 1222 may be placed in channel 1218 in lines 1226, 1228, and 1230. As can be seen, line 1228 of adhesive 1222 may cover gap 1220. In some examples, adhesive 1222 may be placed into gap 1220 to fill gap 1220.

Additionally, installation block 800 may position strip 1004 such that surface 1248 of strip 1004 may be substantially planar to surface 1232 of first skin panel 1202 and surface 1234 of second skin panel 1204 at position 1205. Installation block 800 may hold strip 1004 in this position until adhesive 1222 cures. This placement of strip 1004 at position 1205 may be performed through the selection of height 822 for flanges 816, 818, and 820. Section 900 and section 904 of double-sided tape 802 may attach installation block 800 to surface 1232 of first skin panel 1202 and surface 1234 of second skin panel 1204. This may maintain installation block 800 in desired position 1205 while adhesive 1222 cures. Additionally, adhesive 1222 also may be placed in lines 1236 and 1238 and may be applied through gaps 1240 and 1242 in corners 1244 and 1246.

In this illustrative example, guard rail 1010 and guard rail 1012 may be used to aid in the positioning of strip 1004. In particular, guard rail 1010 and guard rail 1012 may be used to place installation block 800 in a desired location over channel 1218.

Figure 13:
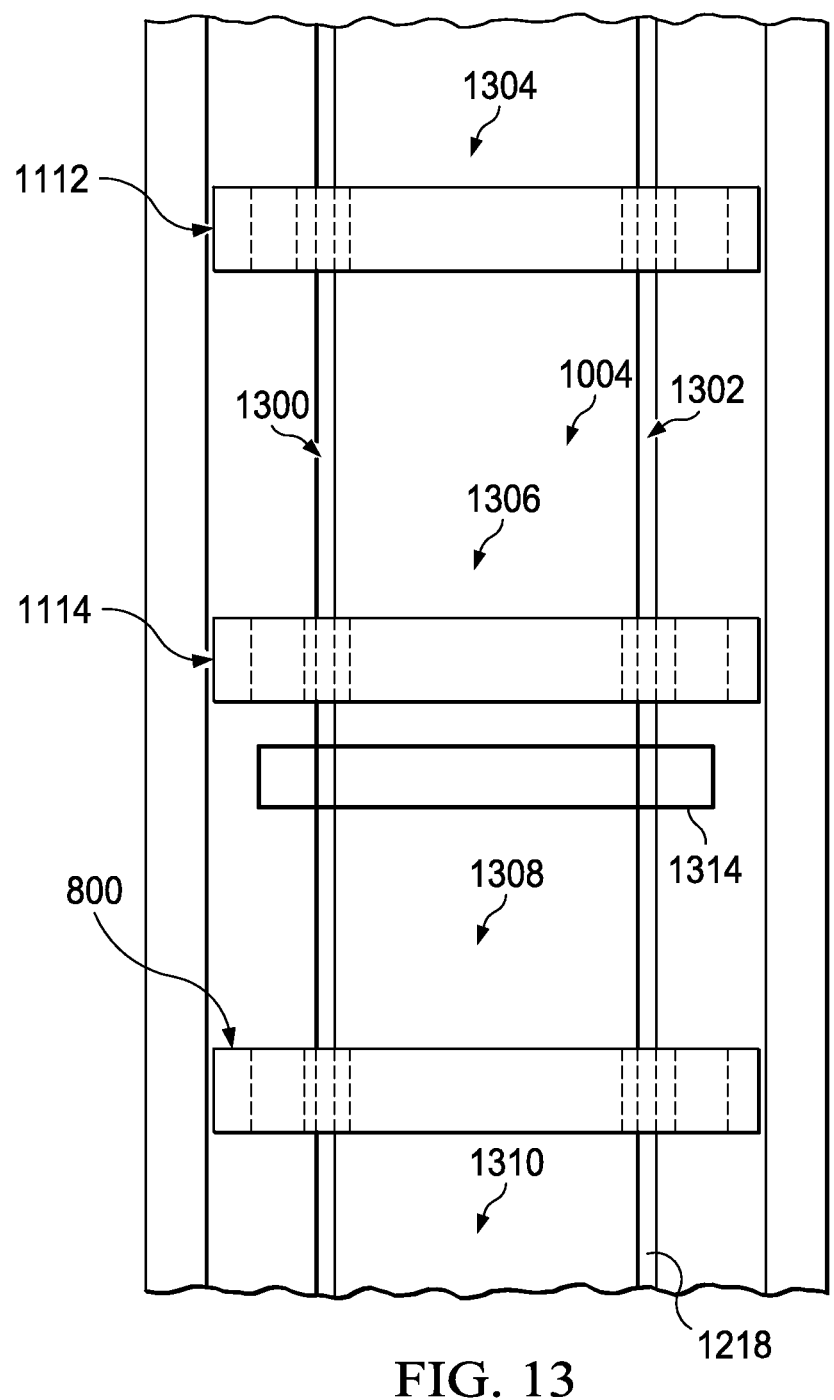
FIG. 13 is an illustration of a top view of a strip installed in a joint in accordance with an illustrative embodiment.

Turning now to FIG. 13, an illustration of a top view of a strip installed in a joint is depicted in accordance with an illustrative embodiment. Installation bar 1000 may be removed after flanges 816 and 820 of installation blocks 800, 1112 and 1114 are attached to the outer surfaces of skin panels 1202 and 1204. As can be seen in this top view, strip 1004 may be located in channel 1218 and held in place while adhesive 1222 (not shown) cures.

As can be seen in this example, gap 1300 and gap 1302 may be present. Gap 1300 and gap 1302 may have a width from around 0.030 inches to around 0.060 inches in this particular example. Of course, the gaps may vary, depending on the particular implementation. Gaps may be present to take into account thermal expansion of different components. Adhesive 1222 may be placed into gaps 1300 and 1302 during curing of adhesive 1222 in channel 1218. Adhesive 1222 may be placed into gaps 1300 and 1302 using, for example, without limitation, a syringe and/or some other suitable device.

In these illustrative examples, sections 1304, 1306, 1308, and 1310 may be unsupported by installation blocks 800, 1112, and 1114. Roller 1314 may be moved over one or more of these sections to squeeze down adhesive 1222. In these examples, additional adhesive 1222 may be added into gaps 1300 and 1302 in channel 1218 to prevent undesirable materials from gathering beneath strip 1004. In other words, adhesive 1222 may be used to fill and/or seal gaps 1300 and 1302.

Installation blocks 800, 1112, and 1114 may be left in place as illustrated in FIG. 13 until adhesive 1222 sets-up and/or cures to a desired level. Thereafter, installation blocks 800, 1112, and 1114 may be removed.

With reference now to FIGS. 14-22, illustrations of a process for installing a strip are depicted in accordance with an illustrative embodiment. These different figures may illustrate one manner in which a strip, such as strip 344, may be installed to complete a joint, such as joint 334 in FIG. 3. This installation may occur, for example, without limitation, during at least one of manufacturing joint 334 and maintenance of joint 334.

Figure 14:
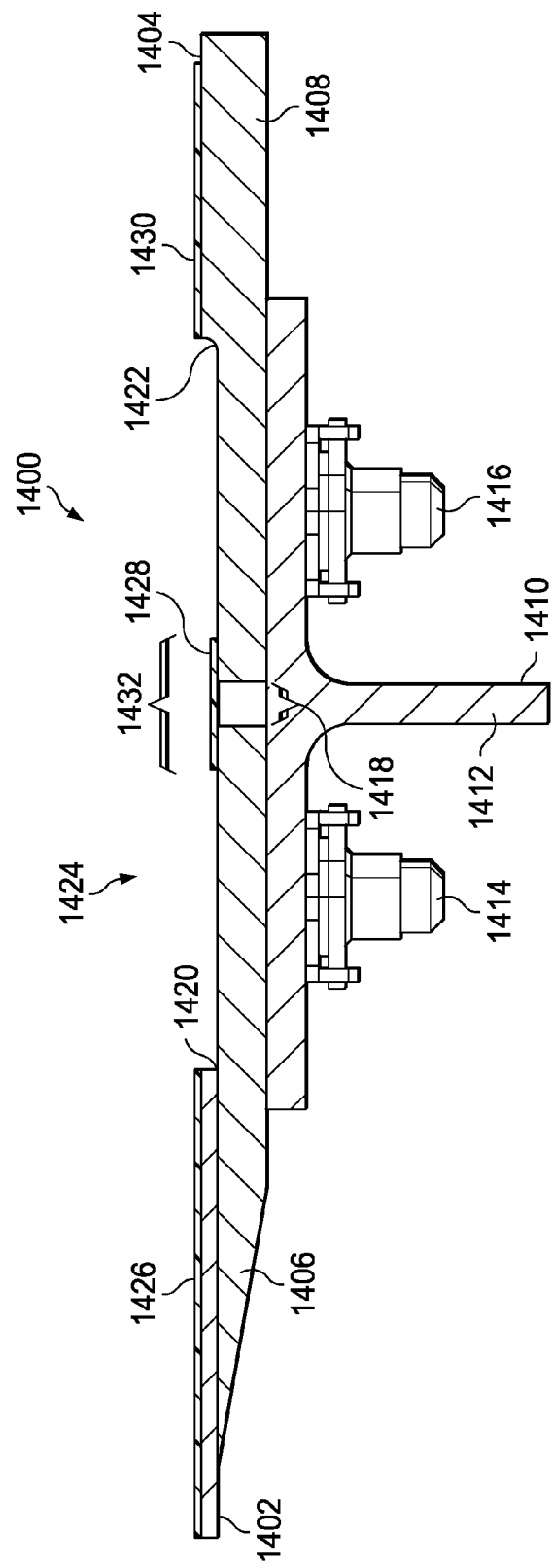
FIG. 14 is an illustration of a joint in which a strip may be installed in accordance with an illustrative embodiment.

With reference to FIG. 14, an illustration of a joint in which a strip may be installed is depicted in accordance with an illustrative embodiment. In this illustrative example, joint 1400 may comprise first skin panel 1402 and second skin panel 1404. First flange 1406 is associated with first skin panel 1402, and second flange 1408 is associated with second skin panel 1404.

In this illustrative example, first flange 1406 and second flange 1408 may be attached to support structure 1410, which may take the form of spar 1412. First flange 1406 may be secured to spar 1412 using fastener 1414. Second flange 1408 may be secured to spar 1412 using fastener 1416.

Gap 1418 may be present between first flange 1406 and second flange 1408 in these examples. Further, step 1420 and step 1422 may be present. This configuration of first skin panel 1402 and second skin panel 1404 may form channel 1424.

Masking material 1426, 1428, and 1430 may be placed over first skin panel 1402, gap 1418, and second skin panel 1404. First skin panel 1402 and second skin panel 1404 may be covered by masking material 1426 and 1430 to prevent contamination of panel surfaces during processing. Masking material 1428 may prevent adhesive from entering gap 1418. Width 1432 for masking material 1428 may be selected having a width capable of preventing adhesive from entering gap 1418.

Figure 15:
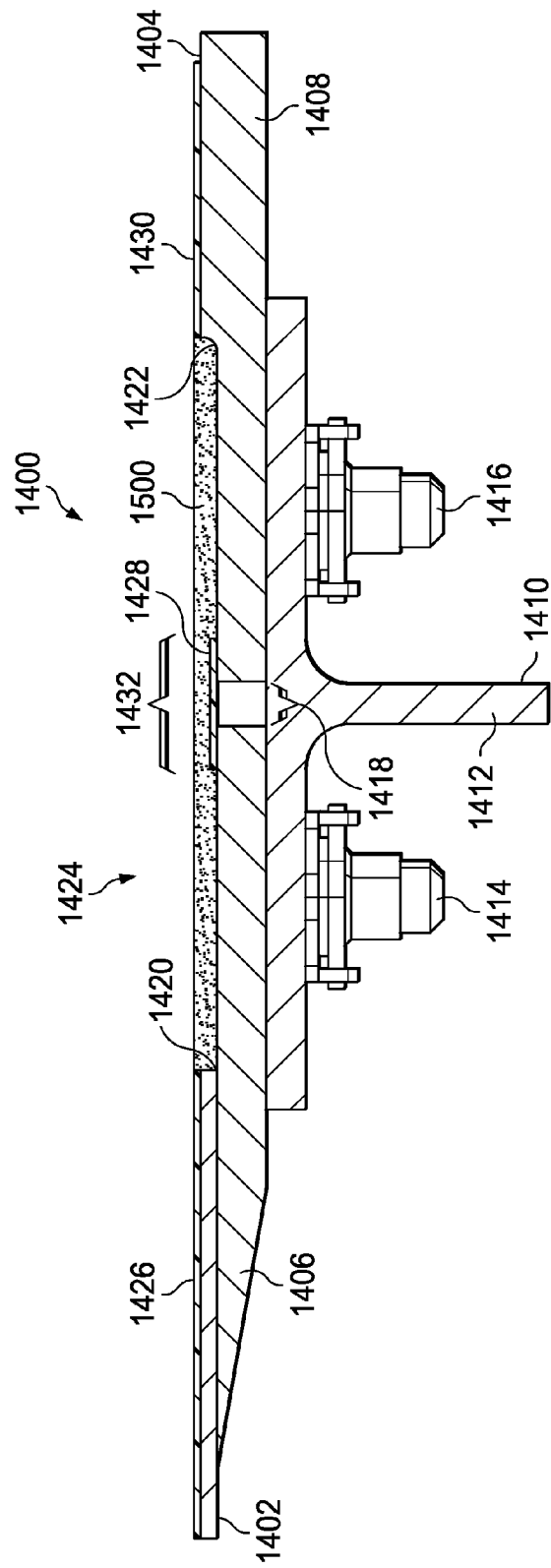
FIG. 15 is an illustration of a channel filled with sealant in accordance with an illustrative embodiment.

With reference now to FIG. 15, an illustration of a channel filled with adhesive is depicted in accordance with an illustrative embodiment. In this illustrative example, adhesive 1500 may be placed into channel 1424.

Adhesive 1500 may be placed into channel 1424 through a number of different mechanisms. For example, without limitation, a pneumatic seal gun with a wide nozzle may be used to apply adhesive. Further, a plastic sweep or other mechanism may be used to level adhesive within channel 1424.

Figure 16:
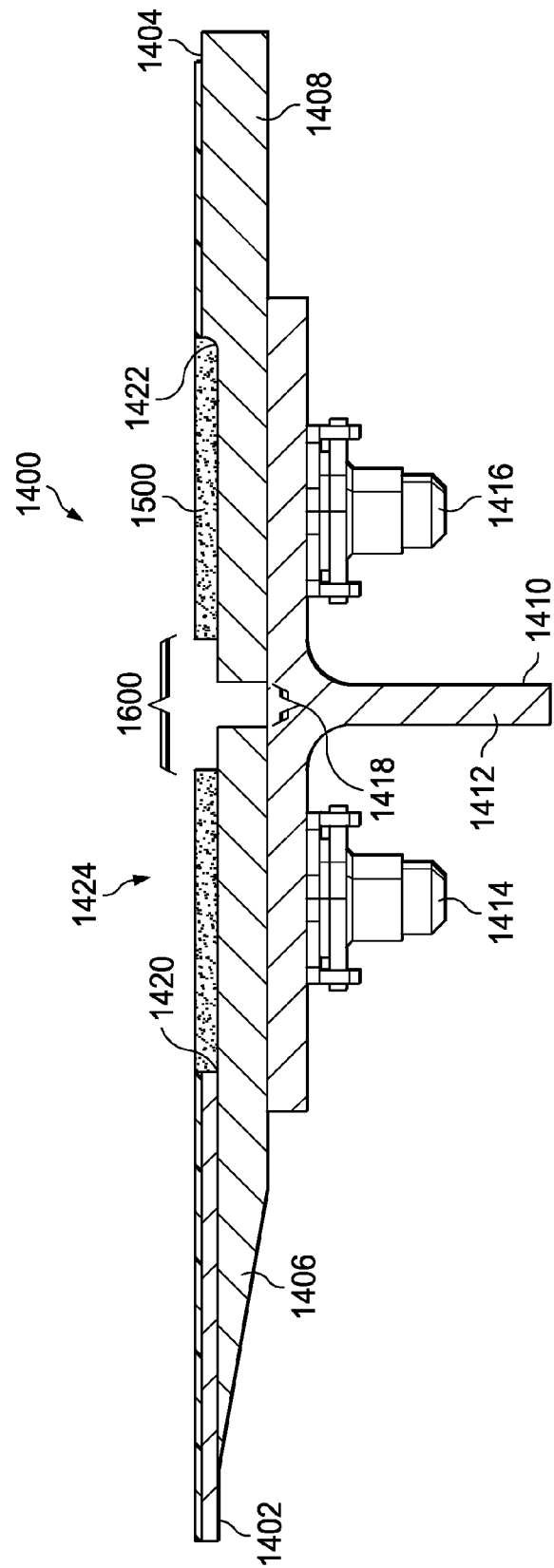
FIG. 16 is an illustration of sealant removed from portions of a joint in accordance with an illustrative embodiment.

With reference next to FIG. 16, an illustration of adhesive removed from portions of a joint is depicted in accordance with an illustrative embodiment. In this illustrative example, masking material 1426, 1428, and 1430 may be removed. In removing masking material 1428, adhesive 1500 may be removed from section 1600 in channel 1424. In this illustrative example, adhesive 1500 may be removed from section 1600 prior to removing masking material 1426 and masking material 1430 from first skin panel 1402 and second skin panel 1404.

Figure 17:
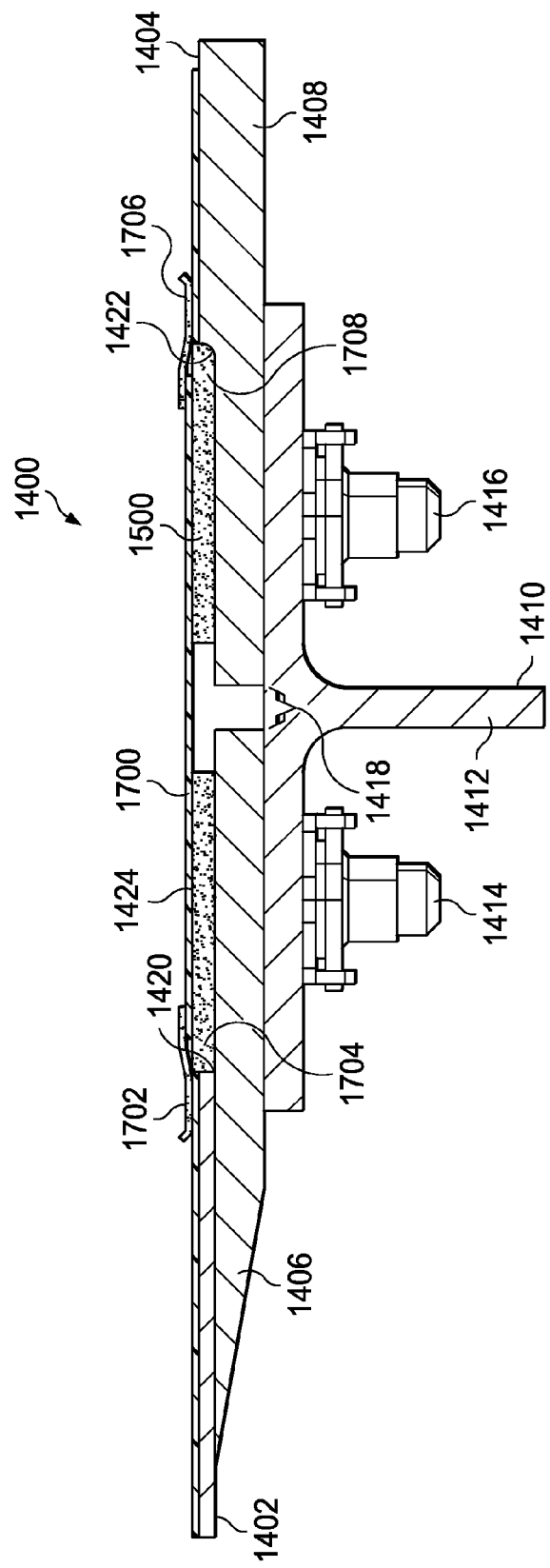
FIG. 17 is an illustration of a strip placed into a channel of a joint in accordance with an illustrative embodiment.

Turning to FIG. 17, an illustration of a strip placed into a channel of a joint is depicted in accordance with an illustrative embodiment. As illustrated in this depicted example, strip 1700 may be placed onto adhesive 1500. Further, tape 1702 may be used to seal side 1704 of strip 1700 to first skin panel 1402. Tape 1706 may be used to seal side 1708 of strip 1700 to second skin panel 1404.

In these illustrative examples, tape 1702 and tape 1706 may take the form of rivet tape. Rivet tape may have two strips of adhesive on the edges of the tape with a center area that has no adhesive.

In these examples, tape 1702 and tape 1706 may be placed onto side 1704 and side 1708 prior to strip 1700 being placed onto adhesive 1500. Thereafter, tape 1702 may be secured to first skin panel 1402, and tape 1706 may be secured to second skin pane 1404.

Figure 18:
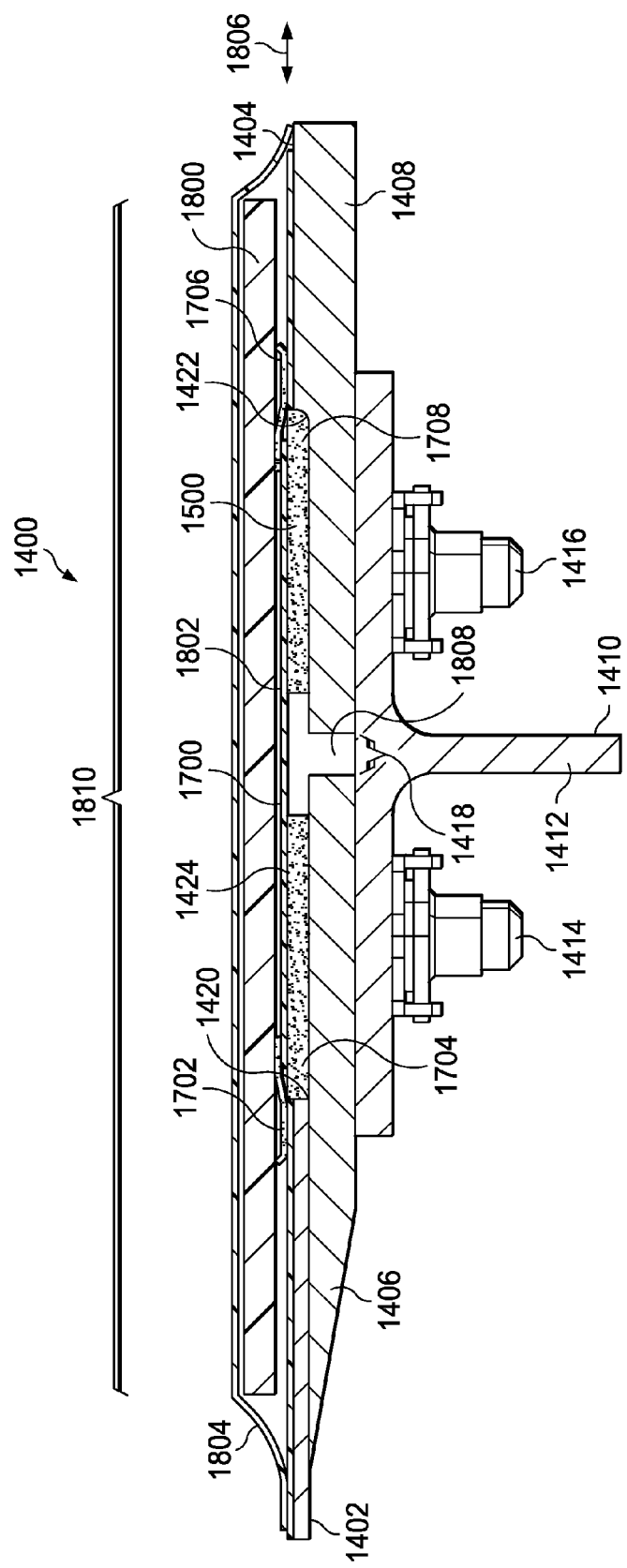
FIG. 18 is an illustration of a caul plate in a vacuum bag placed over a joint in accordance with an illustrative embodiment.

Turning now to FIG. 18, an illustration of a caul plate in a vacuum bag placed over a joint is depicted in accordance with an illustrative embodiment. In this illustrative example, caul plate 1800 may be placed on top side 1802 of strip 1700. Caul plate 1800 also may be taped into place. Further, vacuum bag 1804 may be placed over caul plate 1800 and strip 1700.

In these illustrative examples, caul plate 1800 may be stiffer along the direction of arrow 1806 as opposed to along a direction perpendicular to joint 1400 at point 1808. In these illustrative examples, caul plate 1800 may be comprised of an anisotropic material and/or an isotropic material. Examples of anisotropic materials that may be used include, for example, without limitation, a carbon fiber epoxy, wood, and/or other fiber reinforced composite materials. Examples of isotropic materials that may be used include, for example, without limitation, aluminum, steel, metal alloys, and other suitable materials.

Additionally, caul plate 1800 may have width 1810. Width 1810 may span across a portion of first skin panel 1402, strip 1700, and a portion of second skin panel 1404.

Figure 19:
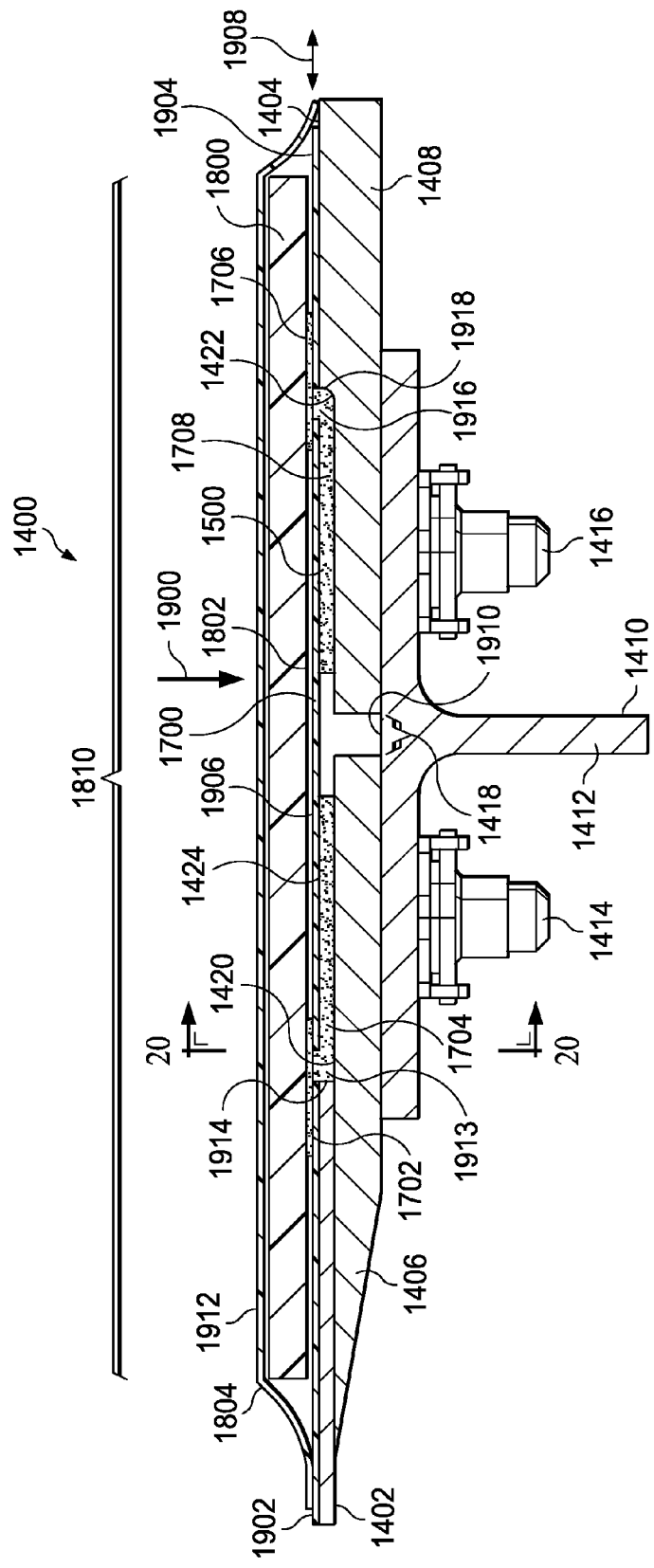
FIG. 19 is an illustration of a vacuum applied to a vacuum bag and caul plate in accordance with an illustrative embodiment.

With reference now to FIG. 19, an illustration of a vacuum applied to a vacuum bag and caul plate is depicted in accordance with an illustrative embodiment. In this illustrative example, a vacuum may be drawn on vacuum bag 1804. This vacuum may be around 25 in-hg to around 27 in-hg in these illustrative examples. The actual vacuum drawn may be selected as one that causes caul plate 1800 to move in the direction of arrow 1900 to force strip 1700 into channel 1424.

In this manner, caul plate 1800 may push strip 1700 in a manner that first surface 1902 of first skin panel 1402, second surface 1904 of second skin panel 1404, and third surface 1906 of strip 1700 are substantially aligned along a plane, including line 1908.

With this movement in the direction of arrow 1900, adhesive 1500 may move into gap 1418. In this illustrative example, end 1910 may be open to the atmosphere to allow movement of adhesive 1500 into gap 1418. In yet other illustrative embodiments, another end (not shown) opposite end 1406 also may be open to the atmosphere to allow movement of adhesive 1500 into gap 1418.

This vacuum may be held until adhesive 1500 has set-up and/or cured. In some illustrative embodiments, resistive heating element 1911 may be incorporated into vacuum bag 1804 to accelerate curing of adhesive 1500.

In this example, gap 1913 may be present between strip 1700 and end 1914 of first skin panel 1402. Gap 1916 may be present between strip 1700 and end 1918 of second skin panel 1404.

Figure 20:
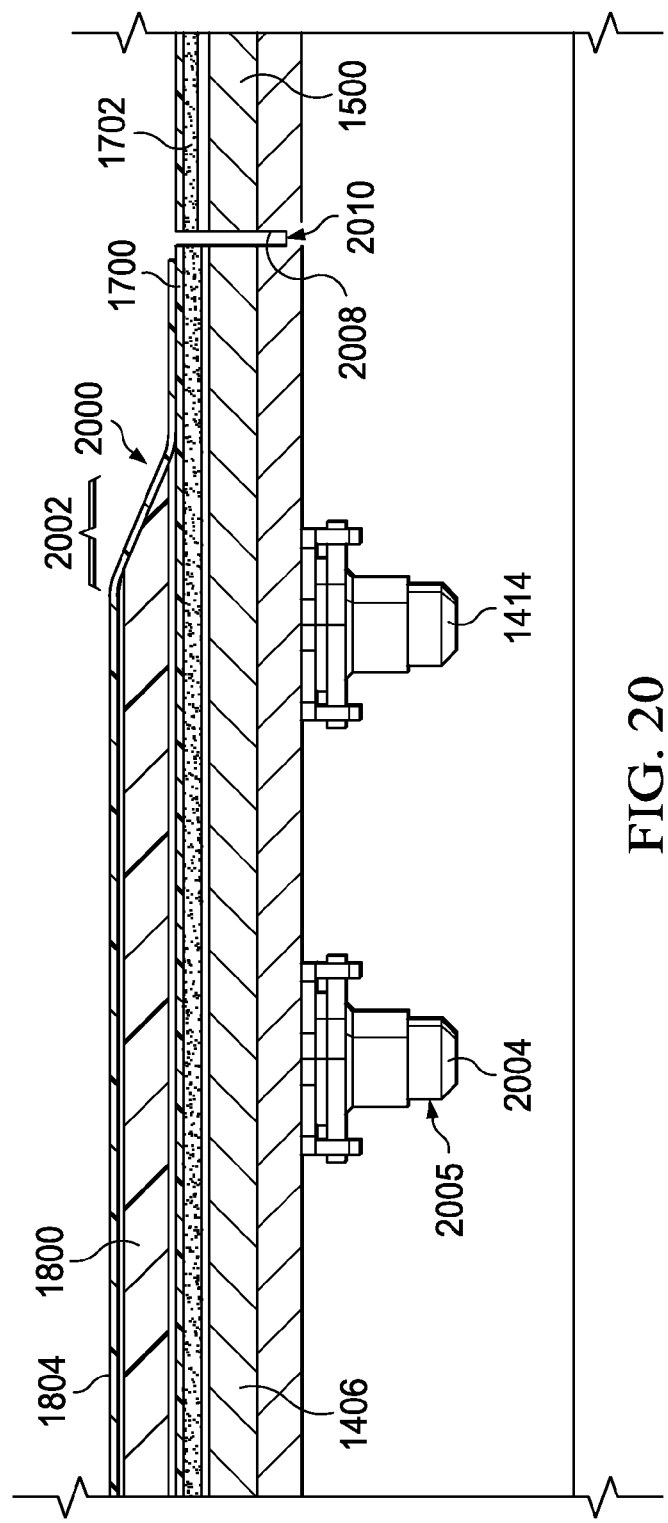
FIG. 20 is an illustration of a vacuum applied to a vacuum bag and a caul plate in accordance with an illustrative embodiment.

Turning now to FIG. 20, an illustration of a vacuum applied to a vacuum bag and a caul plate is depicted in accordance with an illustrative embodiment. In this illustrative example, a view of vacuum bag 1804, caul plate 1800, and strip 1700 on first skin panel 1402 is illustrated taken along lines 20-20 as depicted in FIG. 19. As can be seen in this example, caul plate 1800 has tapered end 2000. As depicted in this example, tapered end 2000 may be shorter in length than strip 1700. In this example, length 2002 of tapered end 2000 may be around ⅜ of an inch.

In this illustrative example, fastener 2004 and fastener 1414 may be fasteners within number of fasteners 2005. First flange 1406 associated with first skin panel 1402, not visible in this view, may be adjacent to flange 2006 in this example. Flange 2006 may be a flange associated with another skin panel not visible in this view.

As depicted in this example, adhesive 1500, strip 1700, tape 1702, and vacuum bag 1804 may stop at end 2008 of first flange 1406. End 2008 may be adjacent to gap 2010 in this example. Gap 2010 may be the gap between first flange 1406 and flange 2006. As can be seen in this illustrative example, gap 2010 may be a location at which a joint may be formed between first skin panel 1402 and the other skin panel not visible in this view. Gap 2010 may be filled with an adhesive either prior to or after application of strip 1700.

Figure 21:
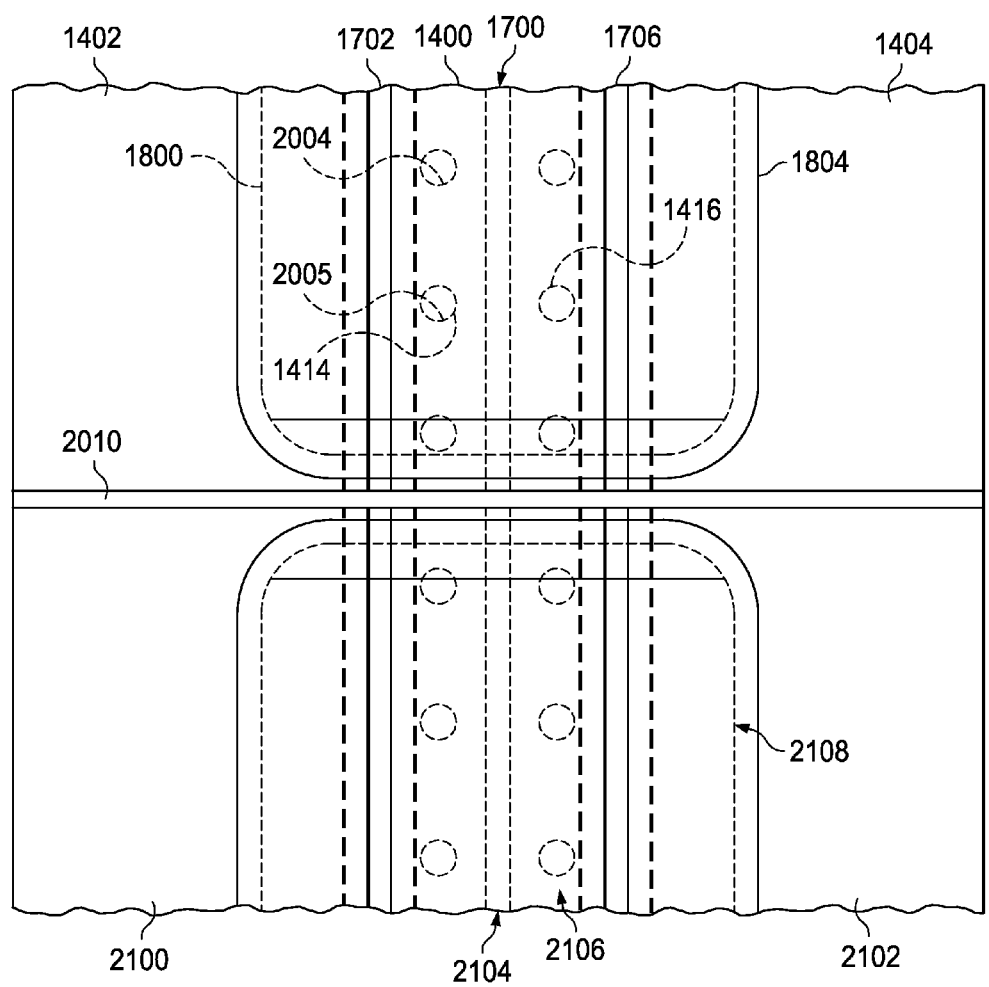
FIG. 21 is an illustration of a top view of a joint formed by using a strip, a caul plate, and a vacuum bag in accordance with an illustrative embodiment.

With reference now to FIG. 21, an illustration of a top view of a joint formed by using a strip, a caul plate, and a vacuum bag is depicted in accordance with an illustrative embodiment. As depicted in this illustrative example, joint 1400 may be formed using strip 1700, caul plate 1800, and vacuum bag 1804.

Flanges 1406, 1408, and 2006 may not be visible in this view. Fasteners within number of fasteners 2005, in addition to fastener 1414, 1416, and 2004, may be visible in this view. In this illustrative example, skin panel 1402 may be positioned adjacent to skin panel 2100 with gap 2010, and skin panel 1404 may be positioned adjacent to skin panel 2102 with gap 2010. Further, in a manner similar to joint 1400, joint 2104 may be formed using skin panel 2100, skin panel 2102, strip 2106, and caul plate 2108.

Figure 22:
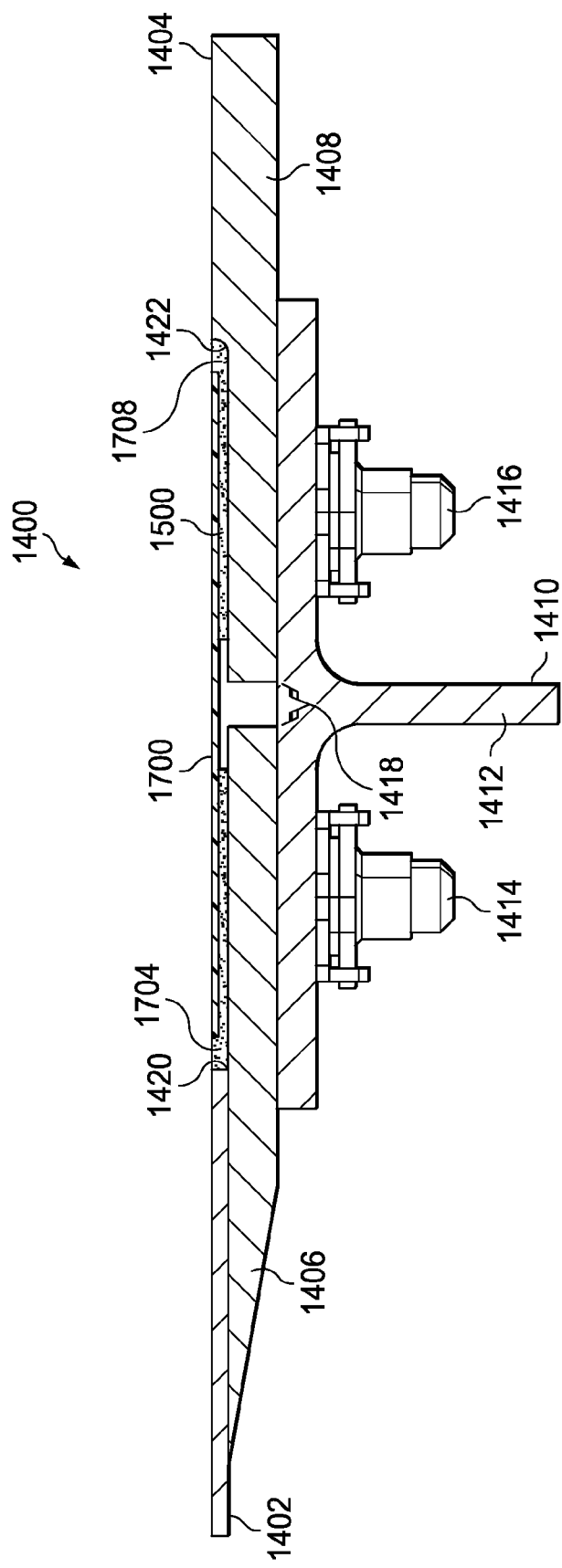
FIG. 22 is an illustration of a completed joint in accordance with an illustrative embodiment.

Turning now to FIG. 22, an illustration of a completed joint is depicted in accordance with an illustrative embodiment.

Figure 23:
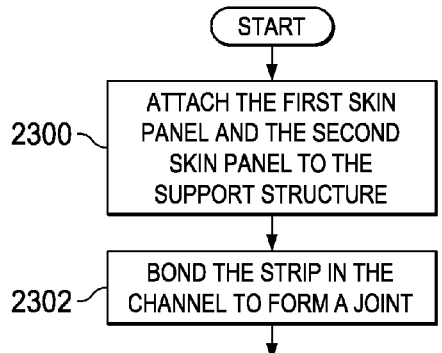
FIG. 23 is an illustration of a flowchart for forming a joint in accordance with an illustrative embodiment.

With reference now to FIG. 23, an illustration of a flowchart for forming a joint is depicted in accordance with an illustrative embodiment. The process in FIG. 23 may be used to form a joint such as, for example, without limitation, joint 334 in FIG. 3, joint 1200 in FIG. 12, and joint 1400 in FIG. 14.

The process may begin by attaching first skin panel 1202 and second skin panel 1204 to support structure 1210 (operation 2300). In these examples, these skin panels may be attached by attaching first flange 1206 for first skin panel 1202 and second flange 1208 for second skin panel 1204 to support structure 1210 using plurality of fasteners 342. The process may then bond strip 1004 in channel 1218 to form joint 1200 (operation 2302), with the process terminating thereafter. In this manner, joint 1200 may have desired state 345 of boundary layer 347 of fluid flow 306. In these examples, fluid flow 306 may take the form of airflow 308, and desired state 345 of airflow 308 in boundary layer 347 may be laminar airflow 310.

Figure 24:
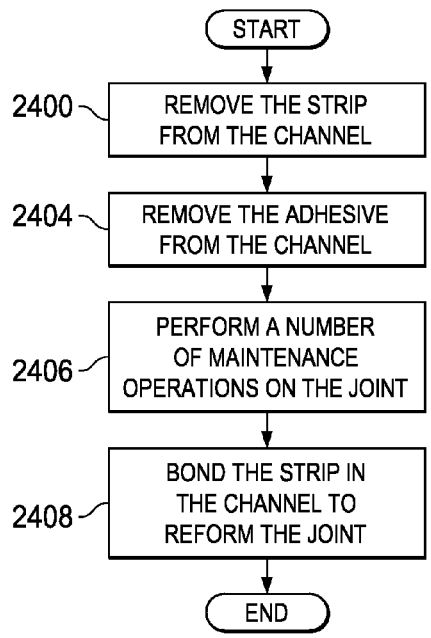
FIG. 24 is an illustration of a flowchart for performing maintenance on a joint in accordance with an illustrative embodiment.

Turning next to FIG. 24, an illustration of a flowchart for performing maintenance on a joint is depicted in accordance with an illustrative embodiment. The process in FIG. 24 may be used to perform maintenance on a joint such as, for example, without limitation, joint 334 in FIG. 3, joint 1200 in FIG. 12, and joint 1400 in FIG. 14.

The process may begin by removing strip 1004 from channel 1218 (operation 2400). Thereafter, adhesive 1222 also may be removed from channel 1218 (operation 2404). Thereafter, a number of maintenance operations may be performed on joint 1200 (operation 2406). These operations may include, for example, without limitation, replacing at least one of first skin panel 1202 and second skin panel 1204, painting at least one of first skin panel 1202 and second skin panel 1204, replacing plurality of fasteners 342, and/or other suitable maintenance operations. Thereafter, the process may then bond strip 1004 in channel 1218 to reform joint 1200 (operation 2408), with the process terminating thereafter.

Figure 25:
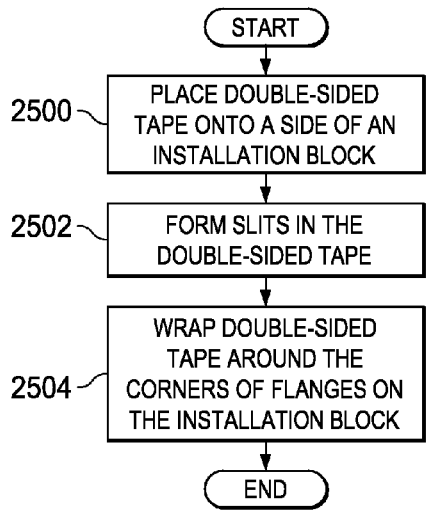
FIG. 25 is an illustration of a flowchart for preparing a strip for bonding in a channel in accordance with an illustrative embodiment.

Turning now to FIG. 25, an illustration of a flowchart for preparing a strip for bonding in a channel is depicted in accordance with an illustrative embodiment. The process illustrated in FIG. 25 may be implemented using installation block 800 in FIG. 8 and assembly crib 1008 in FIG. 10.

The process may begin by placing double-sided tape 802 onto side 804 of installation block 800 (operation 2500). Next, the process may form slit 810 and slit 812 in double-sided tape 802 (operation 2502). Then, double-sided tape 802 may be wrapped around the corners of flanges 816, 818, and 820 on installation block 800 (operation 2504), with the process terminating thereafter. In these examples, section 900 of double-sided tape 802 may be wrapped around corners 906 and 908 for flange 816. Section 902 of double-sided tape 802 may be wrapped around corners 910 and 912 for flange 818. Section 904 of double-sided tape 802 may be wrapped around corners 914 and 916 for flange 820 in installation block 800.

Figure 26:
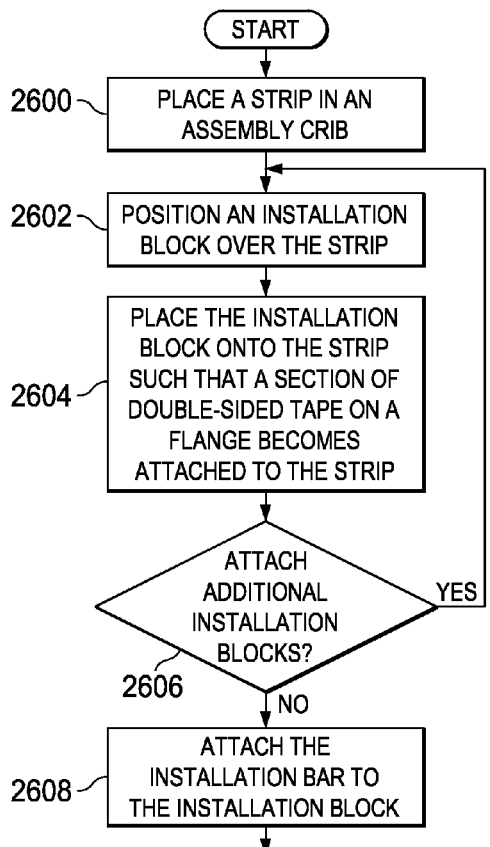
FIG. 26 is an illustration of a flowchart for attaching a strip to an installation block in accordance with an illustrative embodiment.

With reference now to FIG. 26, an illustration of a flowchart for attaching a strip to an installation block is depicted in accordance with an illustrative embodiment. The process illustrated in FIG. 26 may be implemented as part of a process for bonding strip 1004 in channel 1218 as depicted in FIG. 12, which may be one implementation of operation 2302 in FIG. 23 for bonding strip 344 in channel 336.

The process may begin by placing strip 1004 in assembly crib 1008 (operation 2600). Thereafter, installation block 800 may be positioned over strip 1004 (operation 2602). Installation block 800 may then be placed onto strip 1004 such that section 902 of double-sided tape 802 on flange 818 may become attached to strip 1004 (operation 2604). A determination may be made as to whether additional installation blocks are to be attached to strip 1004 (operation 2606).

If additional installation blocks are to be attached, the process returns to operation 2602. A number of installation blocks may be attached to strip 1004 in this manner. If additional installation blocks are not to be attached to strip 1004, installation bar 1000 may be attached to installation block 800 (operation 2606), with the process terminating thereafter. In other words, installation bar 1000 may be attached to installation blocks 800, 1112, and 1114 in these illustrative examples. Thereafter, strip 1004, the number of installation blocks, and installation bar 1000 may be ready for use to install strip 1004 in channel 1218.

Figure 27:
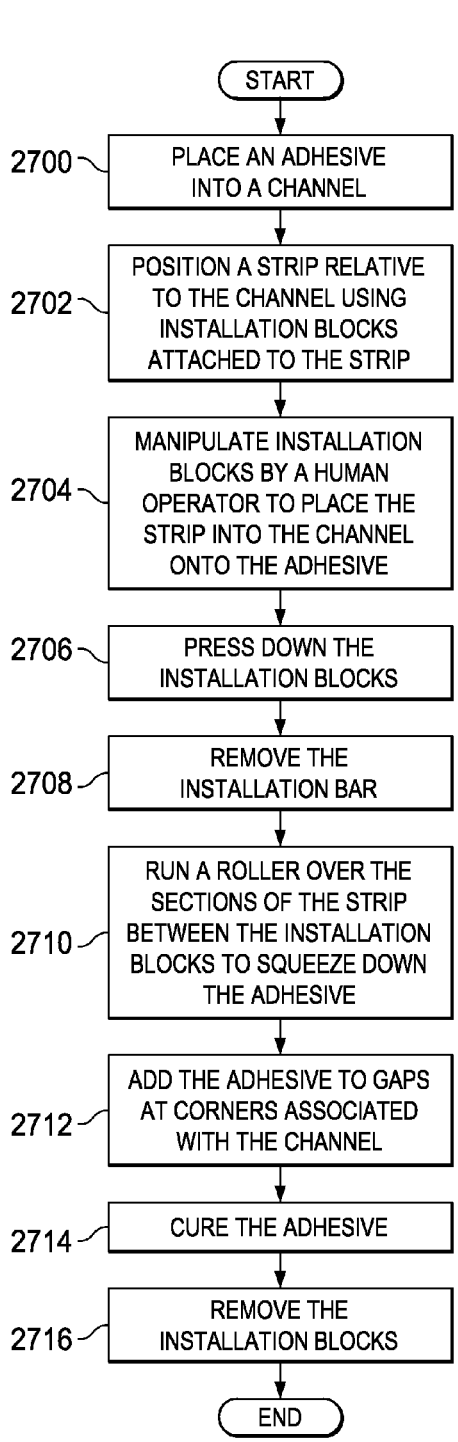
FIG. 27 is an illustration of a flowchart of a process for positioning a strip in a channel for bonding in accordance with an illustrative embodiment.

With reference now to FIG. 27, an illustration of a flowchart of a process for positioning a strip in a channel for bonding is depicted in accordance with an illustrative embodiment. This process may be used in bonding strip 1004 in channel 1218 as depicted in FIG. 12. This process may be one implementation of the process in operation 2302 in FIG. 23 above.

The process may begin by placing adhesive 1222 into channel 1218 (operation 2700). The process may then position strip 1004 relative to channel 1218 using installation blocks 800, 1112, and 1114, which are attached to strip 1004 (operation 2702).

The assembly of installation block 800, installation block 1112, and installation block 1114, as attached to strip 1004 and installation bar 1000, may then be manipulated by a human operator to place strip 1004 into channel 1218 onto adhesive 1222 (operation 2704). This positioning of the installation blocks may provide a desired positioning of strip 1004. The positioning of the installation blocks also may be performed using guard rails 1010 and 1012. In other words, the installation blocks enable precise matching of surface 1232 of first skin panel 1202, surface 1234 of second skin panel 1204, and surface 1248 of strip 1004 in a desired configuration.

The process may then press down on the installation blocks (operation 2706). By pressing down on installation blocks 800, 1112, and 1114, flanges 816 and 820 may be firmly attached to surface 1232 of first skin panel 1202 and surface 1234 of second skin panel 1204. Thereafter, installation bar 1000 may be removed (operation 2708). Roller 1314 may then be run over the sections of strip 1004 between installation blocks 800, 1112, and 1114 to squeeze down adhesive 1222 (operation 2710). In these illustrative examples, these sections may be, for example, without limitation, sections 1304, 1306, 1308, and 1310.

The process may then add adhesive 1222 to gaps 1240 and 1242 at corners 1244 and 1246 associated with channel 1218, respectively (operation 2712). In one illustrative embodiment, adhesive 1222 may be added using a syringe. In other illustrative embodiments, a different type of sealant may be used in the place of adhesive 1222.

The process may then cure the adhesive (operation 2714). Adhesive 1222 may function as a shim once adhesive 1222 has been cured. In this manner, strip 1004 may be maintained in the desired position. The corners of the channel are filled with adhesive/sealant injected by means of a syringe. Thereafter, installation blocks 800, 1112, and 1114 may be removed (operation 2716), with the process terminating thereafter.

Maintenance on joint 1200 may be performed by removing strip 1004 from joint 1200. Other operations also may be performed. Afterwards, strip 1004 or a new strip may be bonded into channel 1218 in the manner described in FIG. 27.

Figure 28:
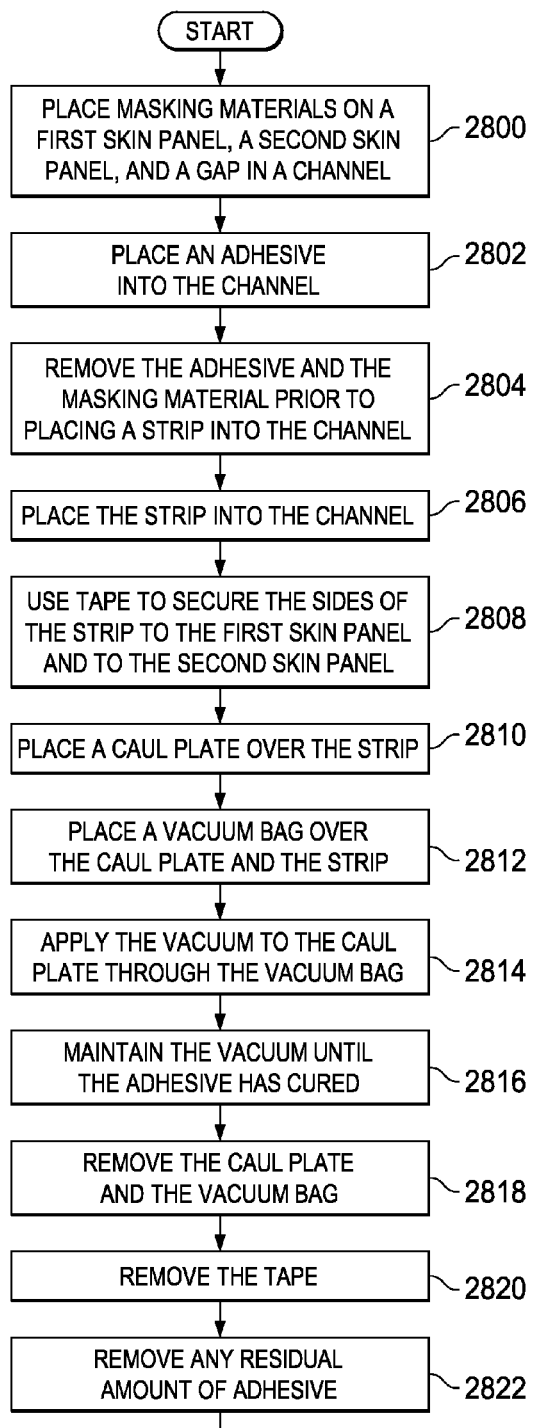
FIG. 28 is an illustration of a flowchart of a process for bonding a strip in a channel in accordance with an illustrative embodiment.

Turning now to FIG. 28, an illustration of a flowchart of a process for bonding a strip in a channel is depicted in accordance with an illustrative embodiment. This process may be used to bond strip 1700 into channel 1424 to form joint 1400. This process may be a more-detailed illustration of operation 2302 in FIG. 23 above.

The process may begin by placing masking material 1426, 1428, and 1430 on first skin panel 1402, second skin panel 1404, and gap 1418 in channel 1424 (operation 2800). Thereafter, adhesive 1500 may be placed into channel 1424 (operation 2802). Adhesive 1500 and masking material 1428 may be removed prior to placing strip 1700 into channel 1424 (operation 2804). Adhesive 1500 and masking material 1428 may be removed to expose gap 1418 within channel 1424.

Next, strip 1700 may be placed into channel 1424 (operation 2806). Tape 1702 may be used to secure side 1704 of strip 1700 to first skin panel 1402, and tape 1706 may be used to secure side 1708 of strip 1700 to second skin panel 1404 (operation 2808). Caul plate 1800 may then be placed over strip 1700 (operation 2810). Additionally, vacuum bag 1804 may be placed over caul plate 1800 and strip 1700 (operation 2812). Operation 2812 may involve securing vacuum bag 1804 around caul plate 1800.

The process may then apply a vacuum to caul plate 1800 through vacuum bag 1804 (operation 2814). With this vacuum, caul plate 1800 may push strip 1700 into channel 1424 in a manner such that first surface 1902 of first skin panel 1402, second surface 1904 of second skin panel 1404, and third surface 1906 of strip 1700 may be substantially aligned along a plane. This alignment may allow for desired state 345 for fluid flow 306. The process may then maintain the vacuum until adhesive 1500 has cured (operation 2816). Thereafter, caul plate 1800 and vacuum bag 1804 may be removed (operation 2818). Tape 1702 and tape 1706 also may then be removed (operation 2820). Any residual amount of adhesive 1500 may then be removed (operation 2822), with the process terminating thereafter.

Figure 29:
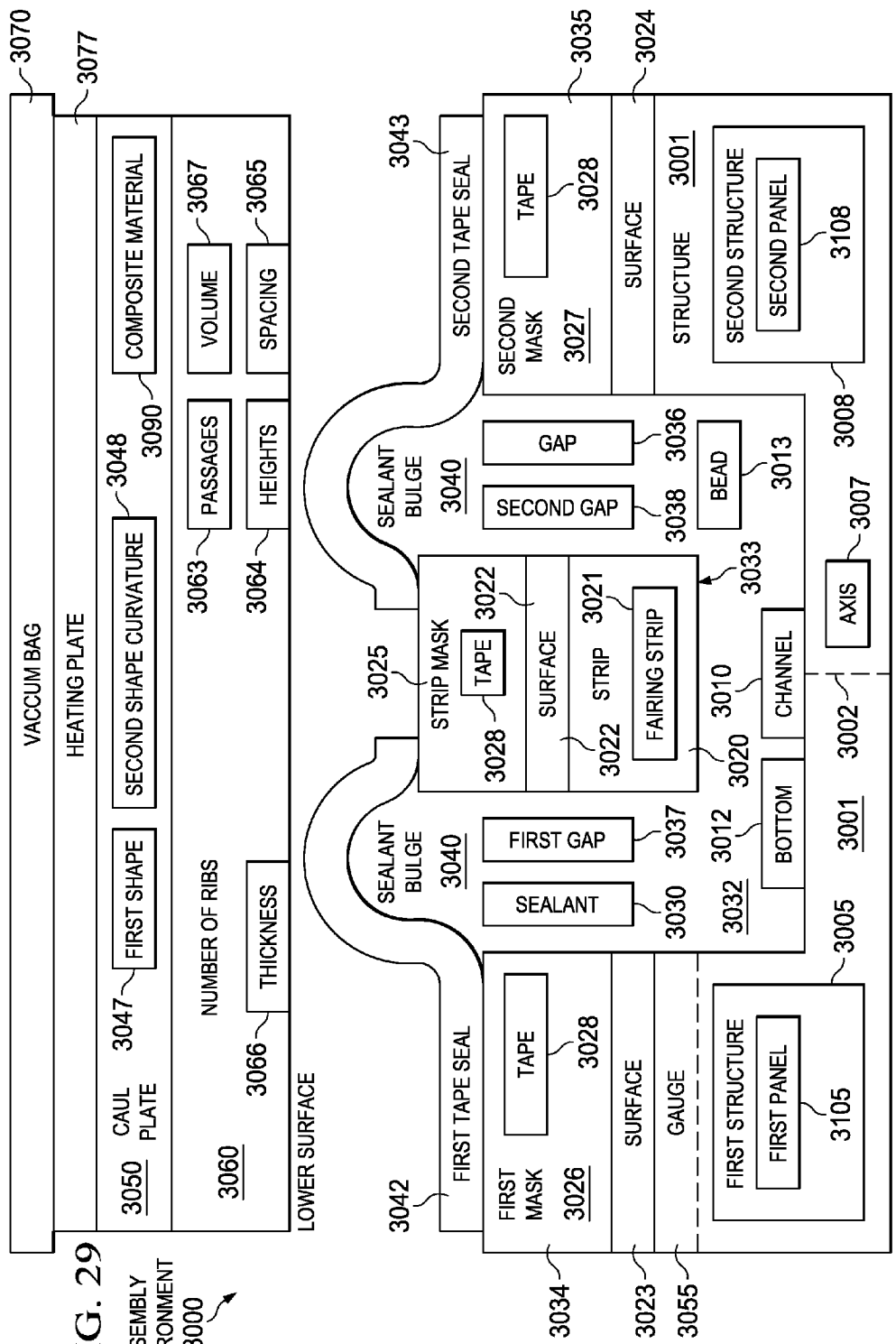
FIG. 29 is an illustration of an assembly environment in accordance with an illustrative embodiment.

With reference now to FIG. 29, an illustration of an assembly environment including a strip and a structure is depicted in accordance with an illustrative embodiment. Assembly environment 3000 depicted in FIG. 29 represents a generalized embodiment and method for positioning and joining a strip to a structure that may have application beyond the field of aviation or aerospace technology. However, in this illustrative embodiment, structure 3001 may be part of or positioned in an aircraft, such as aircraft 200 in FIG. 2. For example, structure 3001 may comprise a panel positioned in aircraft 200.

In these depicted examples, structure 3001 may include first structure 3005 and second structure 3008. Structure 3001 may thus comprise a unitary piece or may comprise a structure that includes first and second components. Hatched line 3002 indicates that structure 3001 may comprise first structure 3005 and second structure 3008. First structure 3005 may comprise first panel 3105, and second structure 3008 may comprise second panel 3108. In an illustrative embodiment, first panel 3105 may correspond to first skin panel 314, as depicted in FIG. 3; and second panel 3108 may correspond to second skin panel 316.

Structure 3001 may define channel 3010. Channel 3010 may comprise a recess or space which can receive strip 3020. Strip 3020 may comprise fairing strip 3021 configured to provide improved airflow over structure 3001. Sealant 3030 may be positioned within channel 3010 so as to secure strip 3020 in channel 3010.

Strip 3020 may comprise a strip surface 3022. Structure 3001 may comprise first structure surface 3023 and second structure surface 3024. First structure surface 3023 may be positioned on first structure 3005, and second structure surface 3024 may be positioned on second structure 3008. Strip mask 3025 may be positioned on strip surface 3022. First mask 3026 may be positioned on first structure surface 3023, and second mask 3027 may be positioned on second structure surface 3024.

Strip mask 3025, first mask 3026, and second mask 3027 may comprise tape 3028. Tape 3028 may be selected from those tapes suitable for masking structures from undesirable penetration of materials such as adhesives and sealants. Tape 3028 may comprise a flexible backing with an adhesive on at least one side of the backing. In an illustrative embodiment, tape 3028 may be applied to a surface such that tape 3028 remains in contact with the surface while other steps in a work process proceed.

In a further embodiment, first mask 3026 may comprise a thickness that is different from a thickness of strip mask 3025 or second mask 3027. The thicknesses may also be substantially the same. A desired thickness of first mask 3026 may be established by providing multiple layers of tape 3028 on top of each other. The multiple layers of tape may be built up so as to achieve a desired thickness. A thickness of first mask 3026 may also be established by providing a single strip of tape 3028 with a desired thickness. Second mask 3027 may also be set at a desired thickness with multiple layers of tape 3028 or thicknesses of tape 3028. It should also be appreciated that first structure 3001 and second structure 3008 need not be positioned at equal heights.

In a further embodiment, gauge 3055 may be placed on structure 3001. Gauge 3055 may provide a spacer of a desired thickness. Gauge 3055 is shown in hatched lines to represent its optional presence. First mask 3026 may be placed on gauge 3055. Gauge 3055 may set first mask 3026 at a desired height or level with respect to strip mask 3025 and second mask 3027.

At a certain step or a desired point in the work process, tape 3028 may be removed from the surface. On a second side of tape 3028, tape 3028 may comprise a surface that allows for the removal of materials such as adhesives or solvents that have come in contact with the second side of the tape.

In an illustrative embodiment, strip mask 3025 extends on strip surface 3022 from first strip edge 3022 to second strip edge 3023. Strip mask 3025 may substantially cover strip surface 3022. First mask 3026 may extend to an edge 3024 of first structure surface 3023, and second mask 3027 may extend to an edge 3035 of second structure surface 3024.

Sealant 3030 may be positioned within channel 3010. In an illustrative embodiment, sufficient sealant 3030 may be provided so as to adhesively bond strip 3020 within channel 3010. An excess of sealant 3030 may be provided in adhesively bonding strip 3020 within channel 3010. In an illustrative embodiment, an excess of sealant 3030 such as an excess of 25% may be provided. Initially, sealant 3030 may be positioned in a selected position of channel 3010 such as bottom 3012 of channel 3010. Sealant 3030 may be provided to bottom 3012 of channel 3010 in a form of a bead 3013 or other configuration. Bead 3013 of sealant 3030 may be applied using tools or machinery.

As used herein, sealant 3030 may include sealing properties. Sealant 3030 may also include adhesive properties. Thus sealant 3030 should also be understood to operate in the manner as described for adhesive 346 in FIG. 3.

Strip 3020 may be positioned within channel 3010 such that strip 3020 may contact sealant 3030. Strip 3020 may initially contact sealant 3030 when sealant 3030 has the form of bead 3013 in bottom 3012 of channel 3010. As strip 3020 is positioned within channel 3010, sealant 3030 may be forced to surround strip 3020. Further, sealant 3030 may be moved so as to occupy gap 3036 that may exist between strip 3020 and structure 3001. Gap 3036 may exist between strip 3020 and first structure 3005 and may also exist between strip 3020 and second structure 3008. Gap 3036 may form first gap 3037 and second gap 3038. In an illustrative embodiment, gap 3036 is approximately 0.02 inches wide.

As strip 3020 is positioned within channel 3010, sealant 3030 may also be forced into sealant bulge 3040. Sealant bulge 3040 may comprise a bulge of sealant 3030 that extends above first structure surface 3023, second structure surface 3024, and strip surface 3022. In an illustrative embodiment, an excess of sealant 3030 is used such that the volume of sealant 3030 extends beyond channel 3010 and into sealant bulge 3040. An excess of sealant 3030 may insure that the gap 3036 between strip 3020 and structure 3001 is completely filled with sealant 3030 leaving no substantial voids or areas lacking sealant 3030. An excess of sealant 3030 may thus help to assure a desired adhesive bond of strip 3020 within channel 3010.

First tape seal 3042 may also be positioned so as to span first gap 3037 between first structure 3005 and strip 3020. Second tape seal 3043 may be positioned so as to span second gap 3038 between second structure 3008 and strip 3020. First tape seal 3042 may be in contact with first mask 3026 and strip mask 3025. Second tape seal 3043 may be in contact with second mask 3027 and strip mask 3025. First tape seal 3042 and second tape seal 3043 may each comprise a length of tape 3028. First tape seal 3042 may act to contain sealant bulge 3040 such that sealant bulge 3040 does not extend or penetrate beyond first tape seal 3042. Second tape seal 3043 may also act to contain sealant bulge 3040 such that sealant bulge 3040 does not extend or penetrate beyond second tape seal 3043.

First shape 3047 may be defined by first structure surface 3023, strip surface 3022, and second structure surface 3024. In an illustrative embodiment, first shape 3047 may correspond to a curvature of an airfoil or other aircraft part. First shape 3047 may include a complex curvature.

Caul plate 3050 may also be included in assembly environment 3000 of FIG. 29. Caul plate 3050 may comprise a composite material. Caul plate 3050 may be positioned onto structure 3001 and strip 3020 so as to position strip 3020 within channel 3010. Caul plate 3050 may be used during a pressing operation such as vacuum bagging.

Caul plate 3050 may include a number of ribs 3060. Number of ribs 3060 may comprise a set of elevated or offset ridges that define a set of passages 3063 between individual pairs of ribs 3060. Number of ribs 3060 may have height 3064 that extends from bottom surface 3052 of caul plate 3050. In an illustrative embodiment, number of ribs 3060 extend approximately 0.25-1.25 inches from bottom surface 3052 of caul plate 3050. Spacing 3065 between individual ribs 3060 may also vary. In an illustrative embodiment spacing 3065 between individual ribs 3060 is approximately 0.5-3.5 inches. In addition, thickness 3066 of individual ribs 3060 may vary, and in an illustrative embodiment, thickness 3066 of an individual rib 3060 is approximately 0.5-1.5 inches.

The dimensions and spacing 3066 of number of ribs 3060 may define volume 3067 defined by passages 3063. Volume 3067 may vary depending on the configuration of caul plate 3050 and number of ribs 3060; however, in an illustrative embodiment, volume 3067 defined by number of ribs 3060 is sufficient to receive sealant bulge 3040 as further described herein. Volume 3067 also may be sufficient to receive expansion of sealant 3030 into sealant bulge 3040 in an efficient and timely manner.

Assembly environment 3000 of FIG. 29 also illustrates that features such as caul plate 3050 and strip 3020 may undergo movement. Strip 3020 may first be positioned with strip 3020 placed on bead 3013 of sealant 3030 such that strip surface 3022 extends above first structure surface 3023 and second structure surface 3024. Caul plate 3050 may be brought into proximity with strip 3020 such that lower surface 3062 of number of ribs 3060 makes contact with strip surface 3022. Caul plate 3050 may press onto strip 3020 in a downward direction, toward structure 3001, forcing strip 3020 to move downward within channel 3010. This movement of strip 3020 may tend to squeeze sealant 3030 through gap 3036 into sealant bulge 3040. Caul plate 3050 may continue to press against strip 3020 until number or ribs 3060 come into contact with structure 3001. Number of ribs 3060 may come into contact with first structure surface 3023 and second structure surface 3024 of structure 3001. Once number of ribs 3060 comes into contact with structure 3001, the downward movement of caul plate 3050 may cease. Number of ribs 3060 contacting structure 3001 may tend to prevent caul plate 3050 from further movement downward.

The contact between number of ribs 3060 with strip 3020 and with first structure surface 3023 and with second structure surface 3024 of structure 3001 also brings strip surface 3022 into substantial alignment with first structure surface 3023 and second structure surface 3024. With strip 3020 positioned in substantial alignment with first structure surface 3023 and second structure surface 3024, curing may take place. Curing may effect a curing of sealant 3030 so as to adhesively bond strip 3020 into channel 3010. Strip 3020 may be adhesively bonded in channel 3010 such that strip surface 3022 substantially aligns with first structure surface 3023 and with second structure surface 3024.

During the movement of strip 3020, sealant bulge 3040 may move into passages 3063. Spacing 3065 of number of ribs 3060 allows sealant bulge 3040 to move into passages 3063. Number of ribs 3060 may define volume 3067 of passages 3063 so as to allow sealant bulge 3040 to readily move into passages 3063. The movement of sealant bulge 3040 into passages 3063 also allows strip 3020 to settle into a desired position within channel 3010.

Sealant 3030, having moved out of channel 3010, may be positioned on first mask 3026, strip mask 3025, and second mask 3027. First mask 3026 protects sealant 3030 from contacting first structure surface 3023, and second mask 3027 protects sealant 3030 from contacting second structure surface 3024. Strip mask 3025 protects sealant 3030 from contacting strip surface 3022. First mask 3026, second mask 3027, and strip mask 3025 may be removed from their surfaces with sealant 3030 on each mask so as to reveal an underlying surface.

First tape seal 3042 and second tape seal 3043 may prevent sealant 3030 from contacting number of ribs 3060 or bottom surface 3052 of caul plate 3050. Sealant bulge 3040 may tend to move above strip surface 3022, first structure surface 3023, and second structure surface 3024. However, it may be undesirable for sealant 3030 to contact number of ribs 3060 or caul plate 3050. For example, curing of sealant 3030, with caul plate 3050 pressing against structure 3001, may also cause caul plate 3050 to adhere to structure 3001.

Protecting against sealant 3030 contacting caul plate 3050 may allow caul plate 3050 to be easily removed from structure 3001. In addition, protecting sealant 3030 from contacting caul plate 3050 also allows caul plate 3050 to be reused.

Structure 3001 and strip 3020 may be configured so as to define an axis 3007. Number of ribs 3060 may be arranged on caul plate 3050 such that number of ribs 3060 has alignment 3053. Caul plate 3050 may be positioned such that alignment 3053 of number of ribs 3060 is positioned at an angle with respect to axis 3007 when caul plate 3050 is positioned on structure 3001 and strip 3020. In an illustrative embodiment, caul plate 3050 is positioned with respect to structure 3001 and strip 3020 such that number of ribs 3060 are set at a substantially normal angle with respect to channel 3010. Other configurations are possible.

Number of ribs 3060 of caul plate 3050 may define second shape 3048. Second shape 3048 may be configured so as to reciprocally match first shape 3047 of structure 3001. When first shape 3047 includes a curvature or a complex curvature, a linear or flat plate would not substantially match with that shape. Thus, by defining second shape 3048 to substantially match the curvature of first shape 3047, caul plate 3050 in the illustrative embodiment may substantially engage structure 3001 and strip 3020. In one illustrative embodiment, caul plate 3050 is more easily brought into contact with structure 3001 and strip 3020 along axis 3007 as compared to other currently used caul plates.

Alignment of strip surface 3022, first structure surface 3023, and second structure surface 3024 as previously described may also include an alignment that includes allowance for any curvature in first shape 3047. In other words the alignment that strip surface 3022 achieves need not be a linear or planar alignment along the entire length of strip 3020. Strip 3020 may bend to accommodate a curvature in first shape 3047. Thus the alignment between strip surface 3022, first structure surface 3023, and second structure surface 3024 also allows for curvature in first shape 3047.

Additional operations such as vacuum bagging and heating may be applied in assembly environment 3000. Vacuum bag 3070 may be positioned so as to contact caul plate 3050 with structure 3001 and strip 3020. Heating plate 3077 may also be positioned so as to apply heat to sealant 3030. Heat may be applied to an area surrounding strip 3020, structure 3001, and sealant 3030 so as to cure sealant 3030.

The advantage presented by substantially matching second shape 3048 with first shape 3047 is also illustrated with respect to vacuum bagging. Vacuum bagging may be used to generate a pressing force between caul plate 3050 and structure 3001. The force generated in vacuum bagging may be limited by atmospheric pressure. Atmospheric pressure may be insufficient to generate good contact between a straight plate with a curved surface, especially if a complex curvature is present. That limitation may be present in the prior art.

Additional forces, such as weights, may be needed to assure good contact in such prior art methods. However, the illustrative embodiments presented herein present a configuration for caul plate 3050 not used with currently available caul plates. For example, caul plate 3050 includes second shape 3048 that substantially matches first shape 3047. In such a configuration, atmospheric pressure from vacuum bagging furnishes an adequate force to contact caul plate 3050 with structure 3001 and strip 3020. This configuration may simplify the assembly process and may reduce the time and expense involved with external weights.

Upon curing of sealant 3030, caul plate 3050 may be removed from structure 3001. First tape seal 3042 and second tape seal 3043 may also be removed. First mask 3026, second mask 3027, and strip mask 3025 may also be removed. Removal of first mask 3026, second mask 3027, and strip mask 3025 may substantially remove excess sealant 3030 present thereon.

The illustration of assembly environment 3000 in FIG. 29 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, structure 3001 may take other forms. For example, structure 3001 may be a panel or panels in a vehicle. Strip 3020 may furnish a function different from a fairing strip; for example, strip 3020 may comprise a structural, connective, or mechanical function.

Figure 30:
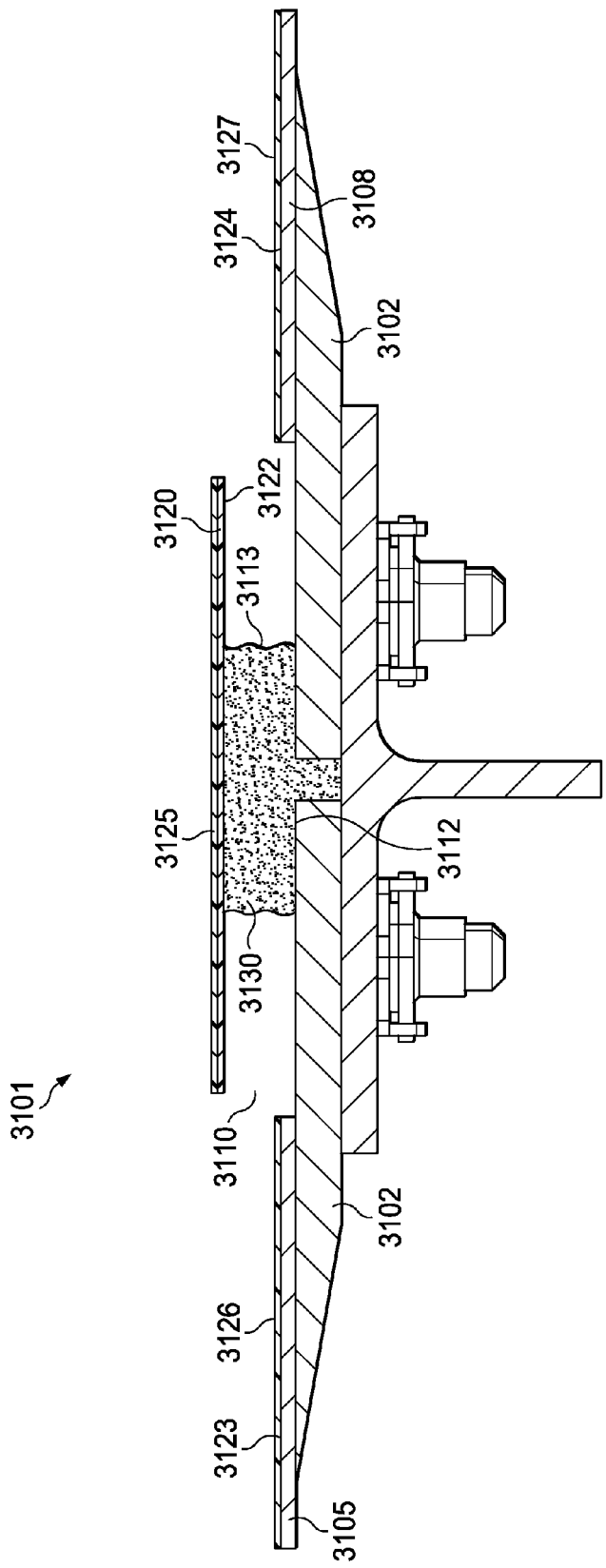
FIG. 30 is an illustration of a portion of a panel structure in accordance with an illustrative environment.

With reference now to FIG. 30, an illustration of a portion of a panel structure 3101 is depicted in accordance with an illustrative embodiment. In this illustrative example, first panel 3105 may be an example of one implementation of first structure 3005 in FIG. 29. Second panel 3108 may be an example of one implementation of second structure 3008 in FIG. 29. Similarly other features and elements in FIG. 30 may be an example of an implementation of features described in FIG. 29.

In this illustrative example, first panel 3105 and second panel 3108 may be attached to an underlying structure 3102. Underlying structure 3102 may be an example of one implementation of aircraft as depicted in FIG. 6. Channel 3110 may be defined between first panel 3105 and second panel 3108. Channel 3110 may define bottom 3112. Bead 3113 of sealant 3130 may be positioned within channel 3110 so as to rest on bottom 3112 of channel 3110. Fairing strip 3120 may contact bead 3113 of sealant 3130. Sealant 3130 may comprise an excess of sealant 3130 necessary to fill channel 3110.

First panel 3105 may define first surface 3123, and first masking tape 3126 may be positioned on first surface 3123. Second panel 3108 may define second surface 3124, and second masking tape 3127 may be positioned on second surface 3124. Fairing strip 3120 may define third surface 3122, and third masking tape 3125 may be positioned on third surface 3122. First surface 3123 and second surface 3124 may be substantially aligned. The alignment of first surface 3123 and second surface 3124 may include alignment in a plane or along a curvature. However, third surface 3122, at the point of assembly as depicted in FIG. 30, may not be in alignment with first surface 3123 and second surface 3124.

Figure 31:
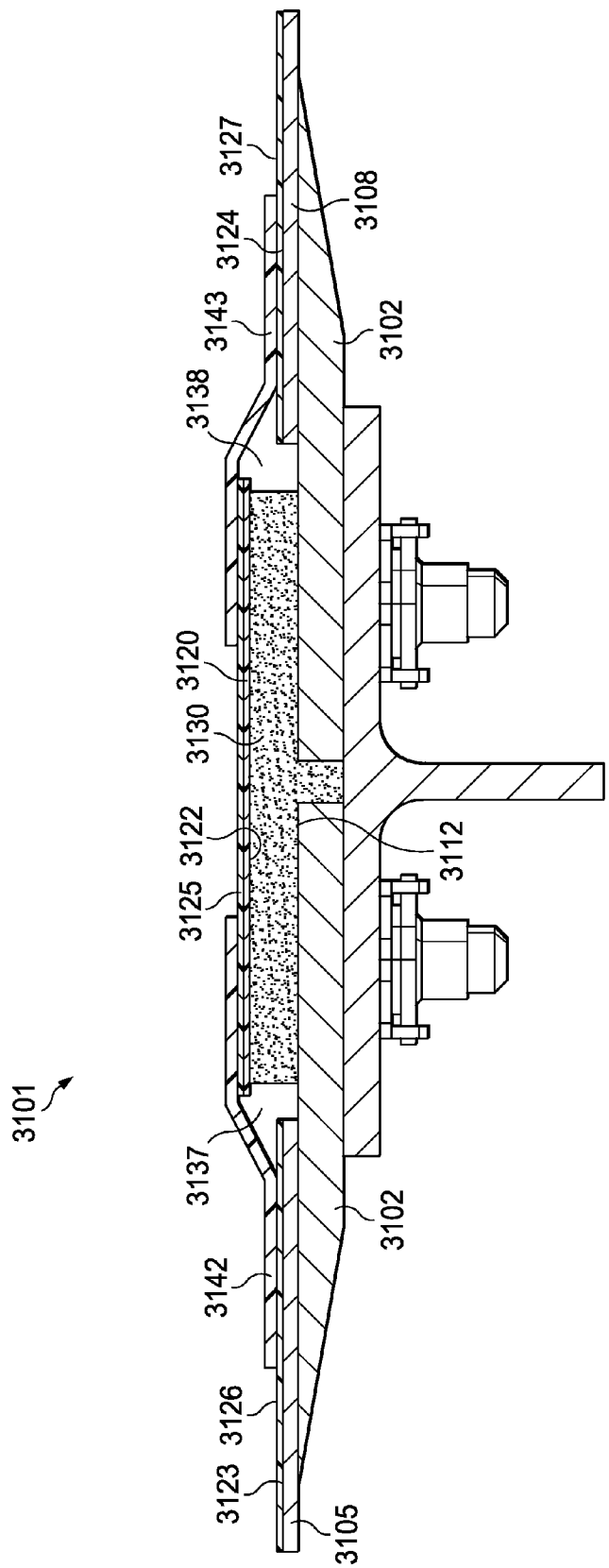
FIG. 31 is a further illustration of a portion of a panel structure in accordance with an illustrative embodiment.

With reference now to FIG. 31, an illustration of a portion of a panel structure 3101 is depicted in accordance with an illustrative embodiment. In this illustrative example, panel structure 3101 may be a further implementation of panel structure 3101 in FIG. 30. In the illustrative example, first tape seal 3142 and second tape seal 3143 may be positioned with respect to panel structure 3101.

First tape seal 3142 may extend from first surface 3123 to fairing strip surface 3122. First tape seal 3142 may be in contact with first masking tape 3126 present on first surface 3123, and first tape seal 3142 may also be in contact with third masking tape 3125 on fairing strip surface 3122. Second tape seal 3143 may extend from second surface 3124 to fairing strip surface 3122. Second tape seal 3143 may be in contact with second masking tape 3127 on second surface 3124, and second tape seal 3143 may also be in contact with third masking tape 3125 on fairing strip surface 3122. First tape seal 3142 may extend over first gap 3137 between fairing strip 3120 and first surface 3123. Second tape seal 3143 may extend over second gap 3138 between fairing strip 3120 and second surface 3124.

Figure 32:
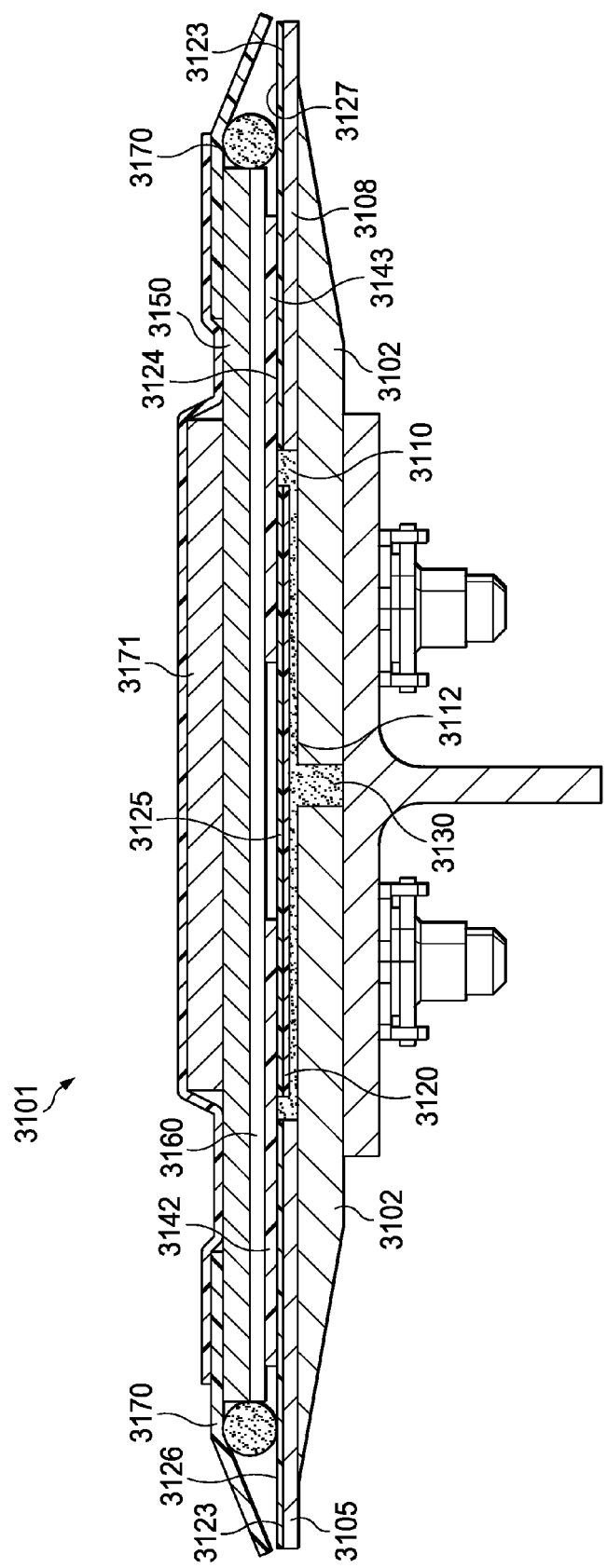
FIG. 32 is a further illustration of a portion of a panel structure in accordance with an illustrative embodiment.

With reference now to FIG. 32, a further illustration of a portion of a panel structure 3101 is depicted in accordance with an illustrative embodiment. In this illustrative example, panel structure 3101 may be a further implementation of panel structure 3101 in FIG. 30. In the illustrative example, caul plate 3150 and vacuum bagging features may be positioned with respect to panel structure 3101.

Caul plate 3150 may be positioned such that first surface 3123, second surface 3124, and strip surface 3122 may be substantially aligned. The substantial alignment may include alignment along the same plane and may include alignment along a curved surface. Number of ribs 3160 connected to caul plate 3150 may press fairing strip 3120 such that fairing strip 3120 comes into alignment with first panel 3105 and second panel 3108. Sealant 3130 may substantially fill channel 3110. Although not shown in FIG. 32, sealant 3130 may also expand into sealant bulge 3040 so as to occupy passages 3063 between number of ribs 3060, as described with respect to FIG. 29.

Vacuum bag 3170 may be positioned to substantially cover caul plate 3150, heating plate 3171, a portion of first panel 3105, fairing strip 3120, and a portion of second panel 3108. Heating plate 3171 may be positioned over caul plate 3150. Heating plate 3171 may supply heat so as to effect a curing of sealant 3130.

Figure 33:
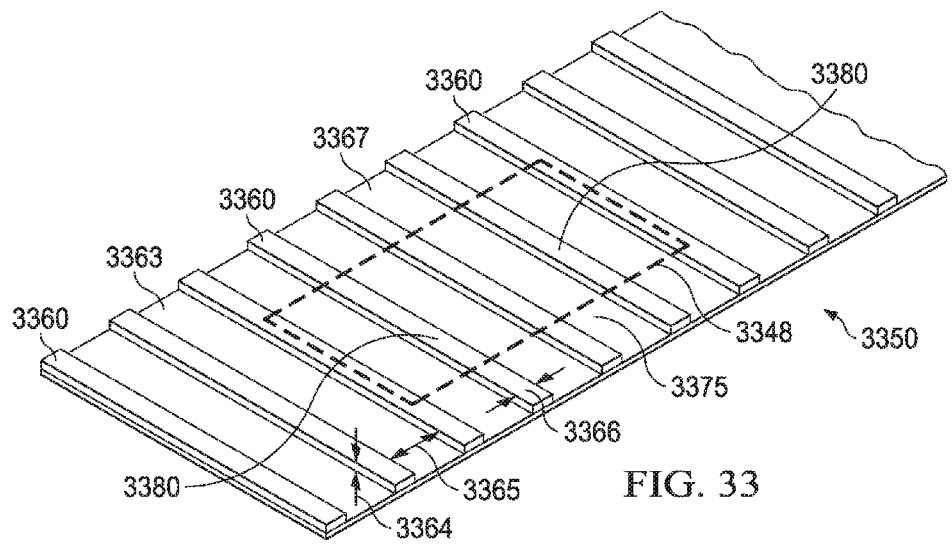
FIG. 33 is an illustration of a caul plate with a number of ribs in accordance with an illustrative embodiment.

With reference now to FIG. 33, an illustration of caul plate 3350 is depicted in accordance with an illustrative embodiment. In this illustrative example, caul plate 3350 may be a further implementation of caul plate 3050 in FIG. 29. In the illustrative example, a bottom perspective view of caul plate 3350 is shown so as to illustrate number of ribs 3360.

Caul plate 3350 may comprise continuous structure 3375 and number of ribs 3360. In an illustrative embodiment, number of ribs 3360 comprises ribs 3360 of a substantially linear configuration. Number of ribs 3360 may be characterized by alignment. Individual ribs 3360 may be characterized by dimensions such as height 3364, thickness 3366, and spacing 3365, so as to define passage 3363 between ribs 3360. Passage 3363 may define volume 3367 which is sufficient to receive sealant (not shown) as described herein. Number of ribs 3360 may be illustrated having substantially uniform dimensions, spacing 3365, and alignment 3353; however other configurations are possible. Number of ribs 3360 may have dimensions and spacing 3465 that vary.

Number of ribs 3360 may further define second shape 3348. Second shape 3348 may be defined by outer surfaces 3380 of number of ribs 3360. Second shape 3348 may be a curvature such as a complex curvature. Second shape 3348 may also be planar. Second shape 3348 defined by number of ribs 3360 may correspond to a first shape of a structure, such as an airfoil, as described herein. Caul plate 3350 may also include other characteristics of caul plate 3350 as described herein, such as with respect to FIG. 18.

Figure 34:
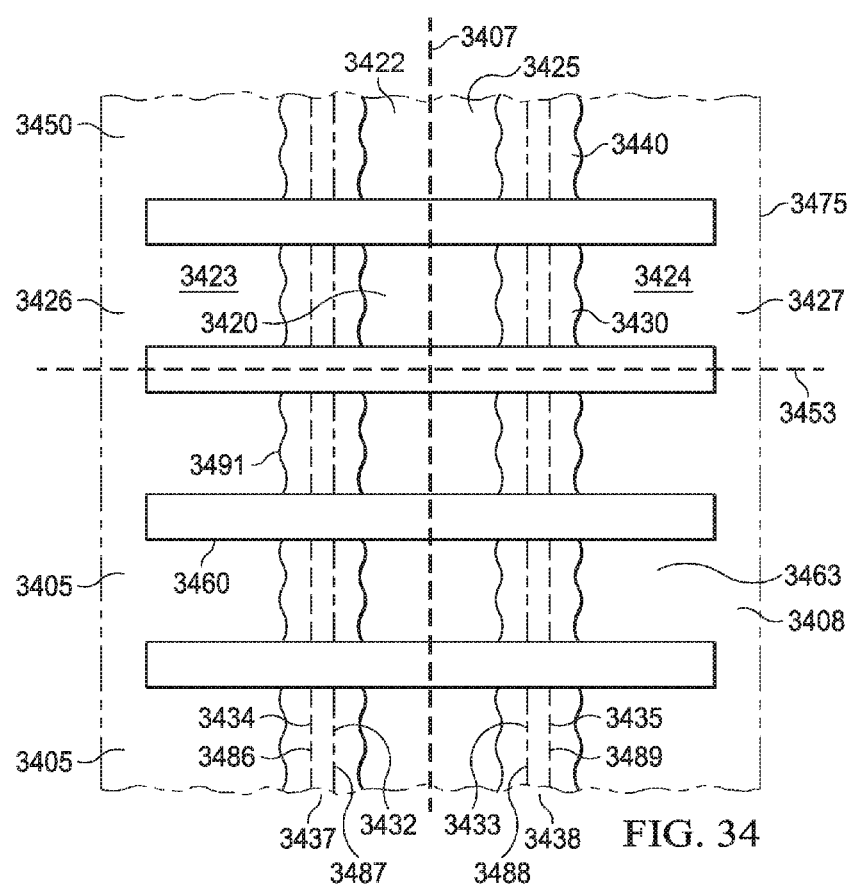
FIG. 34 is an illustration in partial cutaway view of sealant extending into passages of a caul plate in accordance with an illustrative embodiment.

With reference now to FIG. 34, an illustration in partial cutaway view of sealant 3430 extending into passages 3463 of caul plate 3450 is depicted in accordance with an illustrative embodiment. FIG. 34 illustrates a top view in which continuous structure 3475 of caul plate 3550 has been removed. Number of ribs 3460 is illustrated with respect to caul plate 3450.

Number of ribs 3460 may extend from first surface 3423, across fairing strip 3420, to second surface 3424. Number of ribs 3460 includes alignment 3453 such that number of ribs 3460 may be positioned at an angle substantially normal with respect to axis 3407 of fairing strip 3420.

First gap 3437 may exist between fairing strip 3520 and first panel 3405. First hatched line 3486 illustrates edge 3434 of first panel 3405, and second hatched line 3487 illustrates edge 3432 of fairing strip 3420. Second gap 3438 may also exist between fairing strip 3420 and second panel 3408. Third hatched line 3488 may illustrate second edge 3433 of fairing strip 3420, and fourth hatched line 3489 may illustrate edge 3435 of second panel 3408. First hatched line 3486, second hatched line 3487, third hatched line 3488, and fourth hatched line 3489 are illustrated as dashed lines because they are present below sealant 3430.

Sealant 3430 may be present in the form of sealant bulge 3440. Sealant 3430 may squeeze through first gap 3437 and second gap 3438 so as to form sealant bulge 3440. Because sealant 3430 has squeezed through to form sealant bulge 3440, border 3491 of sealant bulge 3540 is shown as uneven.

Sealant 3430 may be present above fairing strip surface 3422, first surface 3423, and second surface 3424. Further, sealant 3430 may be present on first masking tape 3426 positioned on first surface 3423, on second masking tape 3427 positioned on second surface 3424, and on third masking tape 3425 positioned on fairing strip surface 3422. First masking tape 3426, second masking tape 3427, and third masking tape 3425 may prevent sealant from directly contacting first surface 3423, second surface 3424, and fairing strip surface 3422.

Figure 36:
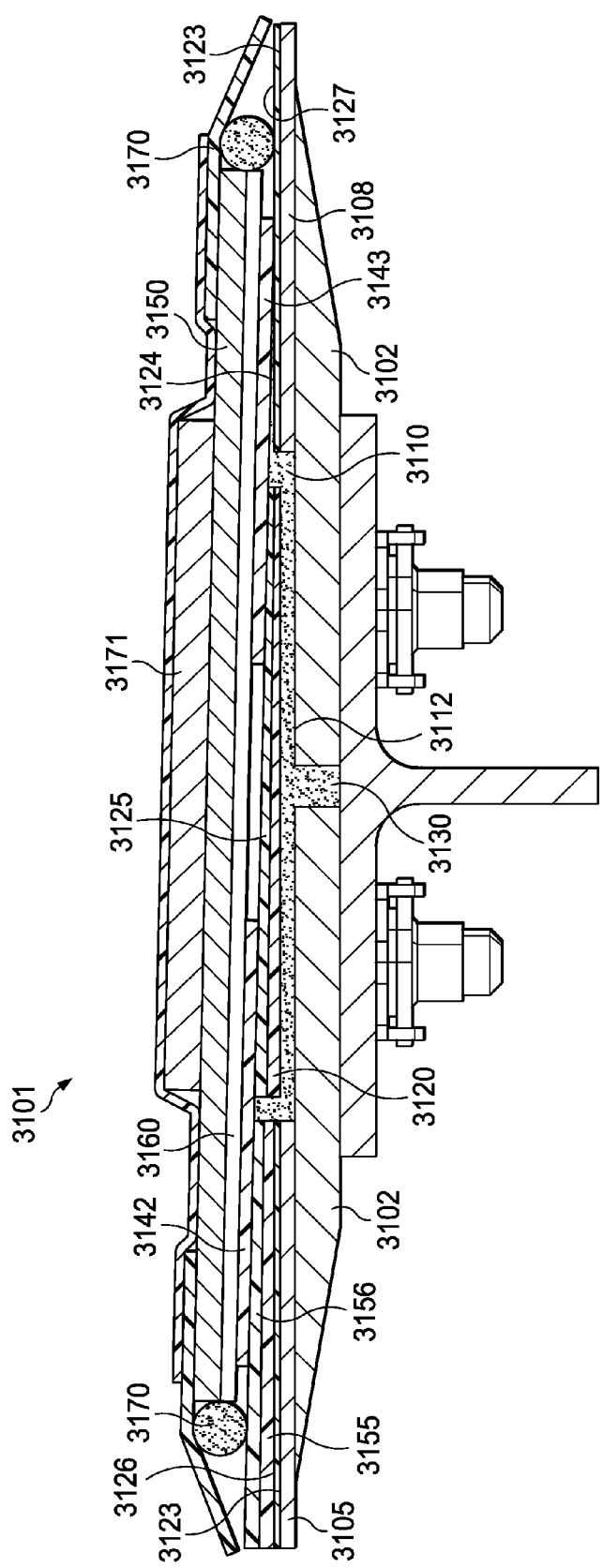
FIG. 36 is a further illustration of a portion of a panel structure in accordance with an illustrative embodiment.

With reference now to FIG. 36, an illustration of a portion of a panel structure 3101 is depicted in accordance with an illustrative embodiment. In this illustrative example, panel structure 3101 may be a further implementation of panel structure 3101 in FIG. 30. FIG. 36 is similar to FIG. 32, but FIG. 36 differs in that it illustrates multiple levels of tape.

FIG. 36 illustrates an exaggerated sloping among first surface 3123, second surface 3124, and strip surface 3122. The sloping is provided, however, to illustrate that a curvature associated with an airfoil may be present among these structures. Caul plate 3150 is flexible and may flex so as to adapt itself to the slope or curvature present among the structures.

First masking tape 3126 may be present on first surface 3123 of first panel 3105. In addition further tape layers may be present on top of first masking tape 3126. FIG. 36 illustrates first additional masking tape 3155 positioned on top of first masking tape 3126, and second additional masking tape 3156 is positioned on top of first additional masking tape 3155. These layers of masking tape establish a desired height or position above first surface 3123. The layers of masking tape may define a desired height above first surface 3123 with respect to other features such as second surface 3124 or strip surface 3122. As previously mentioned a thicker tape and/or a spacer gauge may also be used to achieve a desired height.

Caul plate 3150 may contact second additional masking tape 3155 such that number of ribs 3160 may contact second additional masking tape 3155. Number of ribs 3160 may also come into contact with fairing strip 3120 and second surface 3124. These surfaces may be in a curved alignment that reflects an underlying airfoil; the curved alignment may be different from a linear or straight alignment. Caul plate 3150 flexes so as to follow the curved alignment. However, because the multiple layers of tape establish an increased height over first surface 3123, caul plate 3150 also flexes so as to conform to this height increase over first surface 3123.

The usage of multiple levels of tape as shown in FIG. 36, or gauge as shown in FIG. 29, can be used to set a desired height, offset, or alignment difference between first panel 3105 and second panel 3108. An alignment difference between first panel 3105 and second panel 3108 may be desired to achieve a desired airflow across them. An alignment difference as shown in FIG. 36, where a drop or offset is achieved between first panel 3105 and second panel 3108, can affect airflow so as to minimize eddies or drag. Undesirable eddy currents or drag may result if an increase in offset were instead present.

Figure 35:
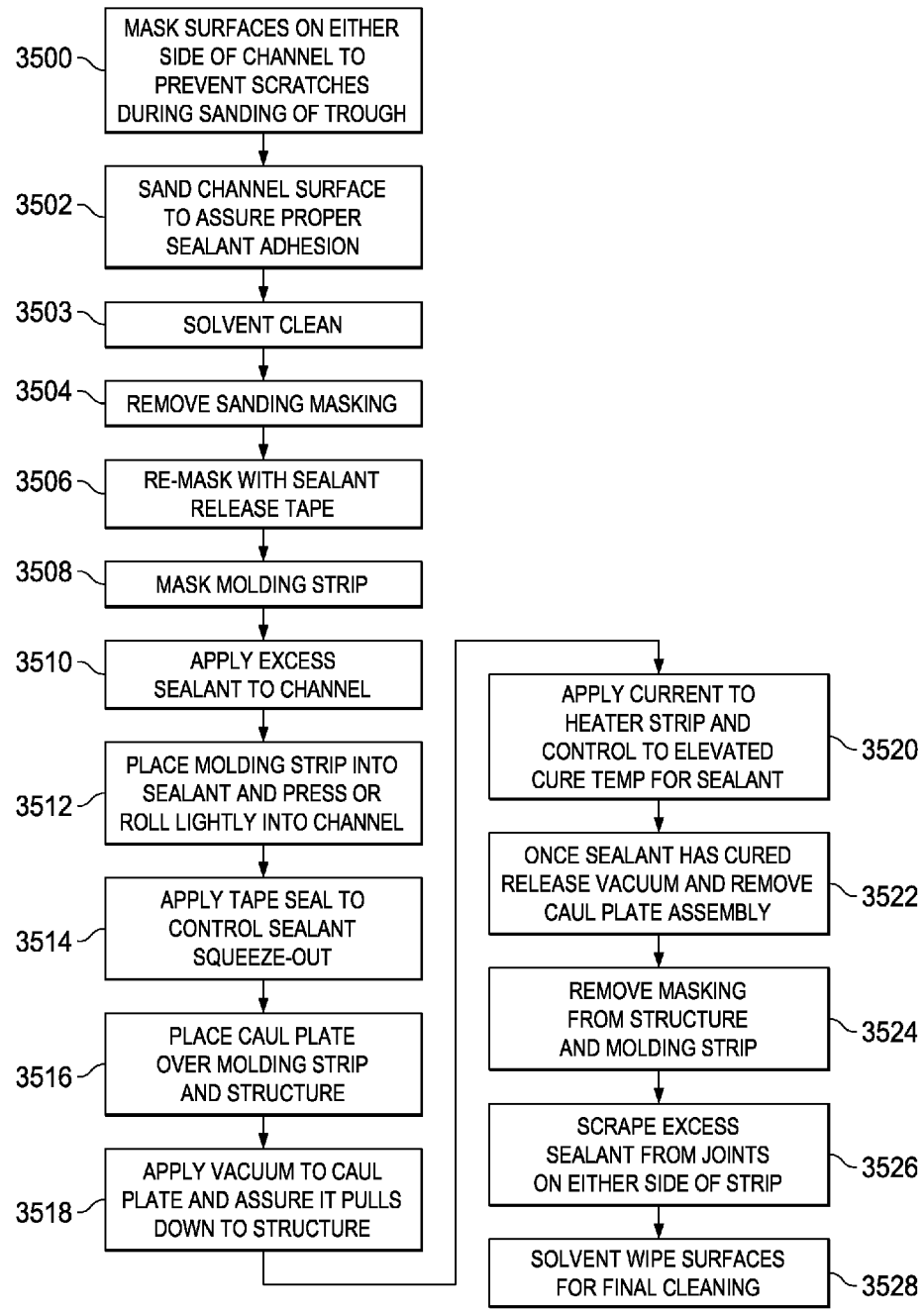
FIG. 35 is an illustration of a flowchart of a process for bonding a strip to a panel structure in accordance with an illustrative embodiment.

With reference now to FIG. 35, an illustration of a flowchart of a process for adhesively bonding a strip to a structure is depicted in accordance with an illustrative embodiment. The process in FIG. 35 may be used to form a structure such as, for example without limitation, the assembly of strip 3020 and structure 3001 in FIG. 29.

The process may begin by masking first structure surface 3023 and second structure surface 3024 (operation 3501). These are surfaces present on either side of channel 3010. This masking is performed to prevent damage to surfaces during a sanding of channel 3010. Masking may include positioning a masking tape on surfaces.

In a further step, channel 3010 may be sanded (operation 3502). The sanding may include sanding surfaces of channel 3010. The sanding is performed so as to improve adhesion of sealant 3030 to be positioned within channel 3010.

In a further step, channel 3010 may be cleaned (operation 3503). Cleaning of channel 3010 may include a solvent cleaning. Solvent cleaning removes residue and debris within channel 3010 from sanding step 3602.

In a further step, masking material may be removed from first structure surface 3023 and second structure surface 3024 (operation 3504). In the embodiment where masking material comprises tape 3028, tape 3028 may be pulled off.

In a further step, first structure surface 3023 and second structure surface 3024 are remasked (operation 3506). Remasking may include positioning first mask 3026 on first structure surface 3023 and second mask 3027 on second structure surface 3024. First mask 3026 and second mask 3027 may comprise tape 3028. Remasking substantially prevents sealant 3030 from contacting first structure surface 3023 and second structure surface 3024.

In a further step, strip 3020 may be masked (operation 3508). Strip 3020 may be masked by applying strip mask 3025 to strip surface 3022. Strip mask 3025 may comprise tape 3028. Strip 3020 may comprise fairing strip 3021. Masking strip surface 3022 substantially prevents sealant 3030 from contacting strip surface 3022.

In a further step, sealant 3030 is applied to channel 3010 (operation 310). Sealant 3030 may be applied in the form of bead 3013 or other form. Bead 3013 of sealant 3030 may be positioned at bottom 3012 of channel 3010. Sealant 3030 may be applied using tools and machinery. Sealant 3030 may be applied such that an excess of sealant 3030 is positioned in channel 3010. An excess of up to 25% of sealant 3030 may be applied in an illustrative embodiment, and other levels of excess are possible.

In a further step, strip 3020 may be positioned in channel 3010 so as to contact sealant 3030 (operation 3512). Strip 3020 may be manipulated so as to obtain good contact between strip 3020 and sealant 3030. Strip 3020 may be manually manipulated by rolling or pressing.

In a further step, first tape seal 3042 and second tape seal 3043 may be applied (operation 3514). First tape seal 3042 may contact first mask 3026 positioned on first structure surface 3023 and may contact strip mask 3025 positioned on strip surface 3022. Second tape seal 3043 may contact second mask 3027 positioned on second structure surface 3024 and may contact strip mask 3025 positioned on strip surface 3022. First tape seal 3042 may span first gap 3037. Second tape seal 3043 may span second gap 3038.

In a further step, caul plate 3050 may be positioned so as to contact strip 3020 (operation 3516). Number of ribs 3060 positioned on caul plate 3050 may contact strip 3020. Number of ribs 3060 may be arranged to have alignment 3053. Caul plate 3050 may be positioned such that alignment 3053 of number of ribs 3060 is positioned substantially transverse to axis 3007 of strip 3020. Other configurations are also possible.

In a further step, vacuum bag 3070 and heating plate 3077 may be applied to caul plate 3050 (operation 3518). Vacuum bag 3070 may also cover strip 3020, a portion of first structure 3005, and a portion of second structure 3008. Vacuum bag 3070 may be operated so as to pull vacuum with vacuum bag 3070. Caul plate 3050 may be gradually forced against strip 3020 so as to move strip 3020 in a direction into channel 3010. Strip 3020 may move within channel 3010 until number of ribs 3060 contact first structure surface 3023 and second structure surface 3024. Movement of strip 3020 brings strip surface 3022 into substantial alignment with first structure surface 3023 and with second structure surface 3024. Alignment of strip 3020 with first structure surface 3023 and second structure surface 3024 may be a planar alignment or may be a curved alignment depending on the shape of structure 3001. Movement of strip 3020 may also move sealant 3030 through first gap 3037 and through second gap 3038 into sealant bulge 3040. Sealant bulge 3040 may be positioned in passages 3063 between number of ribs 3060 of caul plate 3050. An excess of sealant 3030 is managed by moving sealant 3030 out of channel 3010 into passages 3063. It is noted that sealant 3030 may be uncured and thus in a relatively more viscous state as compared to a cured state. The uncured state of sealant 3030 may assist in allowing its movement as described.

In a further step, heating plate 3077 may apply heat so as to cure sealant 3030 (operation 3520). Heating plate 3077 may include elements such as resistors that develop heat through the application of electric current. Other means for producing heat may also be employed. Heating plate 3077 may provide heat sufficient to cure sealant 3030. Heating plate 3077 may also apply heat at a sufficient time and temperature to cure sealant 3030. Heating plate 3077 may be configured so as to provide heat to a general area surrounding strip 3020, first structure 3005, and second structure 3008 where sealant 3030 may be present.

In a further step, vacuum bag 3070, heating plate 3077, and caul plate 3050 may be removed (operation 3522). This step may be performed after sealant 3030 has cured to a sufficient degree. Removal of caul plate 3050 may be assisted in that first tape seal 3042 and second tape seal 3043 have prevented sealant 3030 from substantially contacting caul plate 3050.

In a further step, first tape seal 3042, second tape seal 3043, first mask 3026, second mask 3027, and strip mask 3025 may be removed (operation 3524). Where first mask 3026, second mask 3027, and strip mask 3025 comprise tape 3028, removal includes pulling tape 3028 off the surface on which it is positioned. Sealant 3030 that has cured may be positioned on first mask 3026, second mask 3027, and strip mask 3025. Removal of first mask 3026, second mask 3027, and strip mask 3025 also substantially removes sealant 3030 that is positioned on each mask. In this manner excess sealant 3030 is quickly and efficiently removed from the area surrounding structure 3001 and strip 3020.

In a further step, sealant 3030 may be scraped from the joint between structure 3001 and strip 3020 (operation 3526). While the masking steps and masking removal steps just described may remove substantially all excess of sealant 3030, there may be some amount of sealant 3030 remaining. Some sealant 3030 may be present, for example, directly in the area of gap 3036 where no masking had been positioned. Scraping or other forms of removal may be practiced to remove any remaining sealant 3030.

In a further step, surfaces may be wiped with solvent (operation 3528). Surfaces such as first structure surface 3023, second structure surface 3024, and strip surface 3022 may be wiped with a solvent. This solvent wiping may be a further cleaning step that may remove any residue material adhesive material from masking tape.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, operation 2300 in FIG. 23 may be replaced with an operation in which the strip is removed or maintenance is performed on the joint prior to performing operation 2302.

Thus, the different illustrative embodiments may provide a method and apparatus for a joint for a surface of a platform. In these examples, an apparatus may have a first skin panel having a first surface, a second skin panel having a second surface, a first flange located at the end of the first skin panel, a second flange located at the end of the second skin panel, and a strip having a third surface.

The first skin panel may be located adjacent to the second skin panel such that the first flange and the second flange form a channel. The strip may be bonded in the channel. This location of the strip and channel may be such that fluid flow over the third surface of the strip, the first surface of the first skin panel, and the second surface of the second skin panel may have a desired boundary layer state.

The different illustrative embodiments may provide a capability to generate airflow at a substantially desired state at the boundary layer. For example, the desired state at the boundary layer may be a substantially laminar airflow over the surface of an aircraft.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different advantages as compared to other illustrative embodiments.

Although the different illustrative embodiments have been described with respect to aircraft, the different illustrative embodiments may be applied to other types of platforms. For example, without limitation, other illustrative embodiments may be applied to a mobile platform, a stationary platform, a land-based structure, an aquatic-based structure, a space-based structure, and/or some other suitable object in which fluid flow may be present. More specifically, the different illustrative embodiments may be applied to, for example, without limitation, a submarine, a bus, a personnel carrier, a tank, a train, an automobile, a spacecraft, a surface ship, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for securing a strip in a structure, the method comprising:
    masking a first surface of the strip with a first tape;
    masking a surface of the structure with a second tape, the surface of the structure defining a shape;
    applying a sealant in a channel in the structure;
    positioning the strip in the channel such that a second surface of the strip contacts the sealant;
    subsequently, pressing a caul plate against the first surface of the strip, the caul plate comprising a plurality of ribs comprising passages formed between pairs of ribs in the plurality of ribs, the plurality of ribs defining a shape formed by an outer surface of the plurality of ribs that substantially matches the shape defined by the surface of the structure; and
    causing, via the caul plate pressing against the first surface of the strip, a portion of the sealant to bulge from the channel into the passages and onto the first tape on the first surface of the strip and onto the second tape on the surface of the structure.

2. The method of claim 1 further comprising:
    positioning the strip via using an installation block; and
    applying a tape seal over a gap between the strip and the structure, the tape seal protecting the caul plate from the sealant as the caul plate presses against the strip.

3. The method of claim 1, wherein the channel is aligned in a first direction that extends from a first panel on the structure to a second panel on the structure, wherein the plurality of ribs in the caul plate are aligned in a rib alignment, and wherein the caul plate is positioned such that the first direction aligns substantially parallel to the rib alignment.

4. The method of claim 3, wherein caul plate is positioned such that the rib alignment of the plurality of ribs is substantially transverse to the first direction.

5. The method of claim 1 further comprising:
    contacting the plurality of ribs of the caul plate with the surface of the structure thereby bringing the first surface of the strip into substantial alignment with the surface of the structure.

6. The method of claim 1, wherein the step of pressing a caul against the first surface of the strip further comprises:
    pressing the caul plate such that the plurality of ribs cause the strip to move against the sealant into the channel until the plurality of ribs contact the surface of the structure.

7. The method of claim 1 further comprising:
    the step of heating the caul plate and the strip.

8. The method of claim 1 further comprising:
    the step of removing the first tape and the second tape so as to remove sealant from the first surface of the strip and from the surface of the structure.

9. The method of claim 1, wherein the strip comprises a fairing strip, and wherein the structure and the strip comprise an airfoil.

10. An assembly that comprises:
    a caul plate that comprises a set of ribs configured such that a pair of ribs, in the set of ribs, each press against: a first panel on a structure, a second panel on the structure, and a strip located between the first panel and the second panel, such that the strip contacts a sealant in a channel between the first panel and the second panel such that the pair of ribs form a volume, between the pair of ribs, configured to receive, responsive to a pressure of the caul plate against the strip, a bulge of a sealant into the volume.

11. The assembly of claim 10 further comprising:
    the strip comprising a first surface;
    a strip mask adhered to the first surface of the strip;
    the strip positioned in the channel;
    a masking tape adhered to the first panel; and
    a tape seal that connects to the masking tape and the strip mask, such that the tape seal isolates the bulge from contact with the caul plate.

12. The assembly of claim 11, wherein the surface of the structure defines a curved shape, and wherein the set of ribs define a curvature that substantially matches the curved shape of the structure.

13. The assembly of claim 11, wherein the strip comprises a fairing strip configured for placement into the channel by an installation block, and wherein the structure comprises a panel of a wing.

14. The assembly of claim 11, wherein the sealant is not in contact with the first surface of the strip and is not in contact with the surface of the structure.

15. The assembly of claim 11, wherein the caul plate is positioned such that the set of ribs are aligned substantially transverse to a gap between the strip and the structure.

16. A method for securing a strip in a structure, the method comprising:
- masking a first surface of the strip with a first tape;
- masking a surface of the structure with a second tape, the surface of the structure defining a shape;
- applying a sealant in a channel in the structure, the channel defined by a first panel and a second panel;
- positioning the strip in the channel such that a second surface of the strip contacts the sealant; and
- connecting a tape seal to the first tape and the second tape;
- subsequently, pressing a caul plate against the first surface of the strip, the caul plate comprising a plurality of ribs comprising a passage formed between a pair of ribs in the plurality of ribs, the plurality of ribs defining a shape formed by an outer surface of the plurality of ribs that substantially matches the shape defined by the surface of the structure, such that each rib in the pair of ribs contacts the first panel, the strip, and the second panel; and
- causing, via the caul plate pressing against the first surface of the strip, a portion of the sealant to bulge from the channel into the passage and onto the first tape on the first surface of the strip and onto the second tape on the surface of the structure.

17. The method of claim 16, further comprising:
preventing the bulge from contacting the caul plate via the tape seal isolating the caul plate from the bulge.

\* \* \* \* \*

UNITED STATES PATENT AND TRADEMARK OFFICE
CERTIFICATE OF CORRECTION

| | | |
|---|---|---|
| PATENT NO. | : 9,821,538 B1 | Page 1 of 1 |
| APPLICATION NO. | : 13/766987 | |
| DATED | : November 21, 2017 | |
| INVENTOR(S) | : Harris et al. | |

It is certified that error appears in the above-identified patent and that said Letters Patent is hereby corrected as shown below:

Column 28, Line 57, correct "the surface" to read -- a surface --
    Column 28, Line 67, correct "the surface" to read -- a surface --

Signed and Sealed this
Nineteenth Day of June, 2018

Andrei Iancu
*Director of the United States Patent and Trademark Office*